United States Patent
Swenson

(10) Patent No.: US 10,759,101 B2
(45) Date of Patent: Sep. 1, 2020

(54) CO-INJECTION MOLDED MULTI-LAYER ARTICLE WITH INJECTION-FORMED APERTURE BETWEEN GATE AREA AND PERIPHERAL EDGE

(71) Applicant: Milacron LLC, Cincinnati, OH (US)

(72) Inventor: Paul M. Swenson, South Hamilton, MA (US)

(73) Assignee: Milacron LLC, Cincinnati, OH (US)

( * ) Notice: Subject to any disclaimer, the term of this patent is extended or adjusted under 35 U.S.C. 154(b) by 533 days.

(21) Appl. No.: 14/292,352

(22) Filed: May 30, 2014

(65) Prior Publication Data
US 2015/0209988 A1 Jul. 30, 2015

Related U.S. Application Data

(60) Provisional application No. 61/931,393, filed on Jan. 24, 2014.

(51) Int. Cl.
*B32B 3/24* (2006.01)
*B29C 45/30* (2006.01)
(Continued)

(52) U.S. Cl.
CPC .......... *B29C 45/30* (2013.01); *B29C 45/0046* (2013.01); *B29C 45/164* (2013.01);
(Continued)

(58) Field of Classification Search
CPC ..... Y10T 428/24322; Y10T 428/24339; Y10T 428/24347; B29C 45/2628
(Continued)

(56) References Cited

U.S. PATENT DOCUMENTS 4,554,190 A 11/1985 McHenry et al.
4,805,991 A * 2/1989 Arai .................... B29C 45/1642
264/328.8
(Continued)

FOREIGN PATENT DOCUMENTS

JP S63-154336 A 6/1988
JP H05-57747 A 3/1993
(Continued)

OTHER PUBLICATIONS

International Search Report and Written Opinion by the International Searching Authority for International Application PCT/US2014/040311 dated Sep. 8, 2014 (12 pages).
Jaroschek, C "Passgenaue Verteilung Des Kernmaterials," Kunststoffe International, Carl Hanser Verlag, Munchen, DE, May 2004, (4 pages), XP001182857, ISSN: 0023-5563.

*Primary Examiner* — William P Watkins, III
(74) *Attorney, Agent, or Firm* — Medler Ferro Woodhouse & Mills PLLC

(57) ABSTRACT

Methods and systems for co-injection molding multilayer articles having one or more molded apertures disposed between a gate region and a peripheral region of the article are disclosed. The articles include an interior layer disposed between an inner layer and an outer layer. An article has interior layer coverage over at least 98% of a perimeter of a cross-section of the article downstream of the one or more molded apertures. A method includes modifying fluid flowing past an aperture-forming region of a mold cavity to compensate for the drag of the aperture-forming region on the velocity of the fluid flowing proximal to the aperture-forming region.

10 Claims, 17 Drawing Sheets
(2 of 17 Drawing Sheet(s) Filed in Color)

(51) Int. Cl.
*B29C 45/16* (2006.01)
*B29C 45/00* (2006.01)
*B29C 45/26* (2006.01)
*B32B 3/26* (2006.01)
*B32B 27/08* (2006.01)
*B29L 31/00* (2006.01)
*B29K 101/12* (2006.01)

(52) U.S. Cl.
CPC ...... *B29C 45/1642* (2013.01); *B29C 45/2628* (2013.01); *B32B 3/266* (2013.01); *B32B 27/08* (2013.01); *B29K 2101/12* (2013.01); *B29K 2995/0067* (2013.01); *B29L 2031/712* (2013.01); *B29L 2031/7174* (2013.01); *B32B 2250/03* (2013.01); *B32B 2250/24* (2013.01); *B32B 2439/70* (2013.01); *B32B 2439/80* (2013.01); *Y10T 428/24322* (2015.01); *Y10T 428/24339* (2015.01); *Y10T 428/24355* (2015.01)

(58) Field of Classification Search
USPC .................................. 428/137, 140; 442/58
See application file for complete search history.

(56) References Cited

U.S. PATENT DOCUMENTS

| | | | |
|---|---|---|---|
| 4,895,504 A * | 1/1990 | Kudert | B29C 45/1607 425/133.1 |
| 6,596,213 B2 | 7/2003 | Swenson | |
| 6,908,581 B2 | 6/2005 | Sabin et al. | |
| 7,306,446 B2 | 12/2007 | Sabin et al. | |
| 7,435,480 B2 * | 10/2008 | Sasaki | B32B 27/08 428/411.1 |
| 7,517,480 B2 | 4/2009 | Sabin et al. | |
| 8,491,290 B2 | 7/2013 | Swenson | |
| 8,801,991 B2 | 8/2014 | Swenson | |
| 2011/0217496 A1 | 9/2011 | Swenson | |
| 2012/0015122 A1 | 1/2012 | Swenson | |
| 2014/0272283 A1 | 9/2014 | Swenson | |

FOREIGN PATENT DOCUMENTS

| | | |
|---|---|---|
| JP | 6278164 A | 10/1994 |
| JP | 2003-154556 A | 5/2003 |
| WO | 2013081740 A1 | 6/2013 |

* cited by examiner

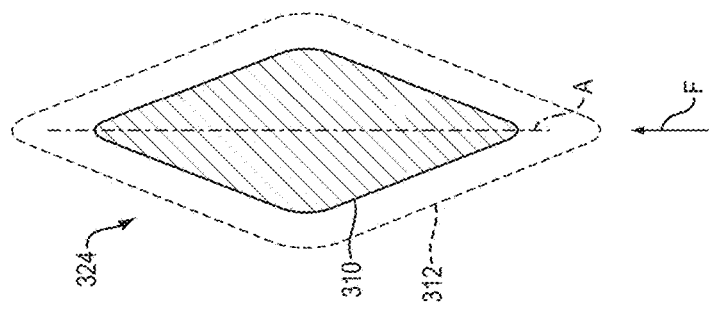
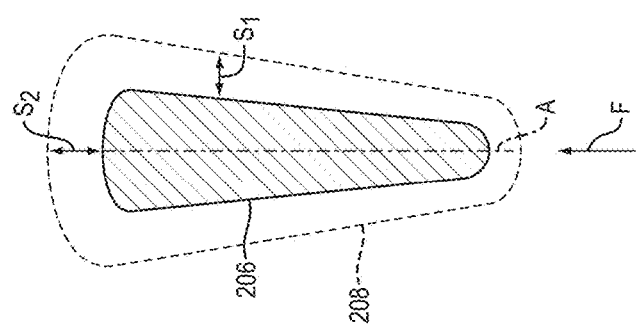
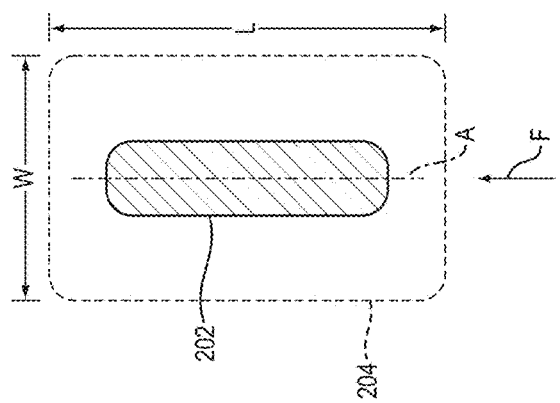
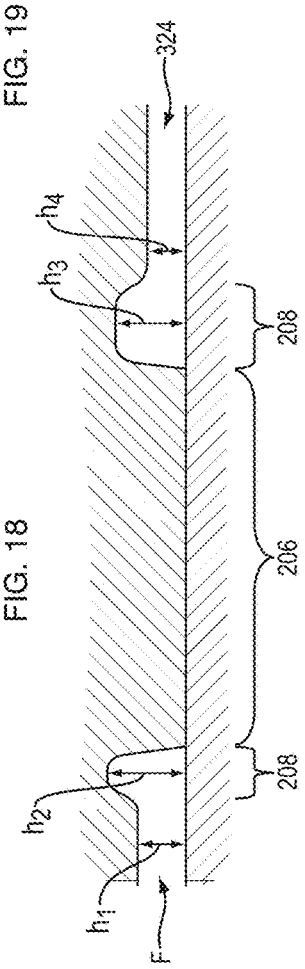
FIG. 17
FIG. 18
FIG. 19
FIG. 20

CO-INJECTION MOLDED MULTI-LAYER ARTICLE WITH INJECTION-FORMED APERTURE BETWEEN GATE AREA AND PERIPHERAL EDGE

CROSS-REFERENCE TO RELATED APPLICATION

This application claims the benefit of priority under 35 U.S.C. § 119(e) of U.S. Provisional Application No. 61/931,393, filed Jan. 24, 2014, which is incorporated by reference herein in its entirety.

FIELD

Example embodiments are directed to methods and systems for forming multi-layer plastic articles, such as containers used to hold food, beverages, pharmaceuticals and nutraceuticals. In particular, example embodiments relate to methods and systems for co-injection molding multi-layer plastic articles that include a molded aperture formed between a gate region and a peripheral region of the article.

BACKGROUND

Multi-layer plastic articles are often used as containers to hold, food, beverages, pharmaceuticals, and nutraceuticals. Some multi-layer plastic articles are commonly made from materials such as polyethylene (PET) and polypropylene (PP). Articles made from PET and PP resist environmental degradation, and are reasonably durable, watertight, and economically produced. However, plastic materials such as PET and PP are gas (e.g., oxygen, nitrogen, etc.) permeable. For applications in which gas permeability is undesirable, for example, containers for food products, medicines and products that degrade upon gas permeation into or out of the container, a plastic article of PET or PP may include an interior layer of a barrier material or a gas scavenger material, such as ethylene vinyl alcohol (EVOH), between skin layers of PET or PP.

Molded plastic articles, such as containers for food, beverages, pharmaceuticals, nutraceuticals, etc., often have an open end used to fill the container with product. Some containers for single serve coffee machines have a multi-layer plastic body including an open top portion through which the container is filled with ground coffee. These coffee containers may also include one or more smaller apertures in a bottom portion through which brewed coffee is dispensed. These coffee containers are conventionally formed by first thermoforming a plastic body with a wide top portion, aligning the thermoformed body with a mechanical punch, and mechanically punching out the smaller aperture(s) in a bottom portion. The additional separate cutting or punching step increases the complexity of the production process. Further, in applications where the accuracy or precision of the position of the aperture, or of the diameter of the aperture is important, sufficient accuracy or precision may be difficult to achieve with a punch process or a cutting process. Further, an aperture formed by a punch process may expose an interior layer of the article to the environment.

A mold cavity with one or more aperture-forming regions can be used to create one or more apertures in an injection-molded article. However, when forming a multilayer co-injection molded article with one or more molded apertures disposed between a gate region and a peripheral region of the multilayer article, generally speaking, each aperture-forming region of the mold cavity disturbs the flow pattern resulting in a large gap in interior layer coverage downstream of each molded aperture.

SUMMARY

Example embodiments described herein include, but are not limited to, a mold for molding a multilayer co-injection molded article with an aperture disposed between a gate region and a peripheral region, a co-injection molding apparatus for forming a multilayer co-injection molded article with an aperture disposed between a gate region and a peripheral region, and a method of co-injection molding a multilayer article with an aperture disposed between a gate region and a peripheral region.

An embodiment includes a mold for molding a multilayer co-injection molded article that includes a first polymeric material and a second polymeric material. The mold includes a mold cavity having a gate region, a peripheral region, an aperture-forming region, and an enhanced velocity region. The aperture-forming region is disposed between the gate region and the peripheral region and is configured to form an aperture in a resulting molded article. The enhanced velocity flow region is proximal to the aperture-forming region and configured to increase a flow velocity of a multilayer flow proximal to the aperture-forming region to form an interior layer of the second polymeric material between an inner layer of the first polymeric material and an outer layer of the first polymeric material. The interior layer extends over at least 95% of a perimeter of a cross-section of the resulting molded article downstream of the aperture.

Another embodiment includes a co-injection molding apparatus. The apparatus includes an injection gate configured for co-injection of a first polymeric material and a second polymeric material and a mold defining a mold cavity. The mold cavity includes a gate region, a peripheral region, an aperture-forming region, and an enhanced velocity region. The aperture forming region is disposed between the gate region and the peripheral region and configured to form an aperture in a resulting molded article. The enhanced velocity region is proximal to the aperture-forming region and configured to increase a flow velocity of a multilayer flow proximal to the aperture-forming region to form an interior layer of the second material between an inner layer of the first material and an outer layer of the first material with the interior layer extending over at least 95% of a perimeter of a cross-section of the resulting molded article downstream of the aperture.

In some embodiments the mold cavity has a first thickness in a region adjacent to the enhanced velocity region and the mold cavity has a second thickness, greater than the first thickness, in the enhanced velocity region.

In some embodiments the enhanced velocity region is configured to increase a flow velocity of the multilayer flow proximal to the aperture-forming region to form the interior layer extending over at least 99% of a perimeter of a cross-section of the resulting molded article downstream of the aperture.

In some embodiments the enhanced velocity region is configured to increase a flow velocity of the multilayer flow proximal to the aperture-forming region such that that a flow velocity along a first flow path passing through the enhanced velocity region proximal to the aperture-forming region at a position downstream of the aperture-forming region and the enhanced velocity region is equal to or greater than a flow velocity at a corresponding position along a second flow path located away from the enhanced velocity region.

Another embodiment includes a method of co-injection molding a multi-layer article. The method includes injecting a first polymeric material into a mold cavity configured to form a molded article including an inner layer of the first polymeric material and an outer layer of the first polymeric material. The mold cavity includes at least one aperture-forming region configured to form an aperture between a gate region and a peripheral edge of the resulting molded article. The method also includes co-injecting a second material into the mold cavity interior to the first polymer material to form an interior layer of the second material between the inner layer and the outer layer with the aperture extending through the interior layer. The method further includes during injection, modifying the flow of the first polymeric material and the second polymeric material in an enhanced velocity region proximal to the aperture-forming region of the mold cavity so that a flow velocity along a first flow path passing through the enhanced velocity region proximal to an aperture-forming region at a position downstream of the aperture-forming region and the enhanced velocity region is equal to or greater than a flow velocity at a corresponding position along a second flow path located away from the aperture forming region and the enhanced velocity region.

In some embodiments the flow of the first polymeric material and the second polymeric material proximal to the aperture-forming region of the mold cavity is modified such that the interior layer extends over at least 95% of a perimeter of a cross-section of the resulting article downstream of the aperture.

In some embodiments the flow of the first polymeric material and the second polymeric material proximal to the aperture-forming region of the mold cavity is modified such that the interior layer extends over at least 99% of a perimeter of a cross-section of the resulting article downstream of the aperture.

In some embodiments the flow of the first polymeric material and the second polymeric material proximal to the aperture-forming region of the mold cavity is modified by a region of increased cavity thickness proximal to the aperture-forming region of the mold cavity.

In some embodiments an outer stream of the first polymeric material encases an interior stream of the second polymeric material when co-injecting the second material into the cavity.

An embodiment includes a co-injection molded multi-layer article. The article including an inner layer comprising a first polymeric material, an outer layer comprising the first polymeric material, and an interior layer comprising a second polymeric material. The interior layer is disposed between the inner layer and the outer layer. The article also includes and a molded aperture disposed between a gate region of the article and a peripheral edge region of the article, the molded aperture extending through the inner layer, the outer layer, and the interior layer, with the interior layer extending over at least 95% of a perimeter of a cross-section of the article downstream of the molded aperture.

In some embodiments the interior layer extends over at least 98% of a cross-sectional perimeter of the article downstream of the aperture. In some embodiments the interior layer extends over at least 99% of a cross-sectional perimeter of a cross-section of the article downstream of the aperture.

In some embodiments the article has an increased thickness region proximal to the aperture.

In some embodiments, the article has a sealable portion and the interior layer terminates proximate to the sealable portion.

In some embodiments the interior layer is a barrier layer or a scavenger layer.

In some embodiments the article has a first sealing surface and a second sealing surface, and the interior layer covers at least 95% of a surface area of the article between the first sealing surface and the second sealing surface. In some embodiments the interior layer covers at least 99% of a surface area of the article between the first sealing surface and the second sealing surface.

BRIEF DESCRIPTION OF THE DRAWINGS

The patent or application file contains at least one drawing executed in color. Copies of this patent or patent application publication with color drawings will be provided by the Office upon request and payment of the necessary fee.

The drawings are intended to illustrate the teachings taught herein and are not intended to depict relative sizes and dimensions, or to limit the scope of examples or embodiments. In the drawings, the same numbers are used throughout the drawings to reference like features and components of like function. Throughout the figures, thicknesses are exaggerated for illustrative purposes. Further, relative thicknesses are not representative.

FIG. 17 schematically depicts a plan view of a portion of a cavity including an elongated aperture-forming region and associated enhanced velocity region, in accordance with some embodiments.

FIG. 18 schematically depicts a plan view of a portion of a cavity including a wedge shaped elongated aperture-forming region and associated enhanced velocity region, in accordance with some embodiments.

FIG. 19 schematically depicts a plan view of a portion of a cavity including a diamond shaped elongated aperture-forming region and associated enhanced velocity region, in accordance with some embodiments.

FIG. 20 schematically depicts a cross-sectional view of the portion of the cavity in FIG. 18 illustrating thicknesses of the flow path in the enhanced velocity region.

DETAILED DESCRIPTION

Example embodiments include molds, apparatuses, systems and methods for co-injection molding a resulting multi-layer article having a molded aperture between a gate region and a peripheral edge region of the article. The article has an inner layer of a first material, an outer layer of a first material, and an interior layer of a second material between the inner layer and the outer layer. During injection, flow of the first material and the second material proximal to an aperture-forming region of the mold is modified to achieve increased interior layer coverage downstream of the aperture. In some embodiments, a mold cavity has aperture-forming regions and enhanced velocity regions proximal to the aperture-forming regions. The enhanced velocity regions increase a flow velocity downstream of an aperture, as compared with a mold cavity having aperture-forming regions without enhanced velocity regions. In some embodiments, interior layer coverage is at least 98% around a perimeter of a cross-section of the resulting article downstream of an aperture. In some embodiments, interior layer coverage is at least 95% around a perimeter of a cross-section of a resulting article downstream of an aperture (e.g., near an open end of the article).

Figure 1:
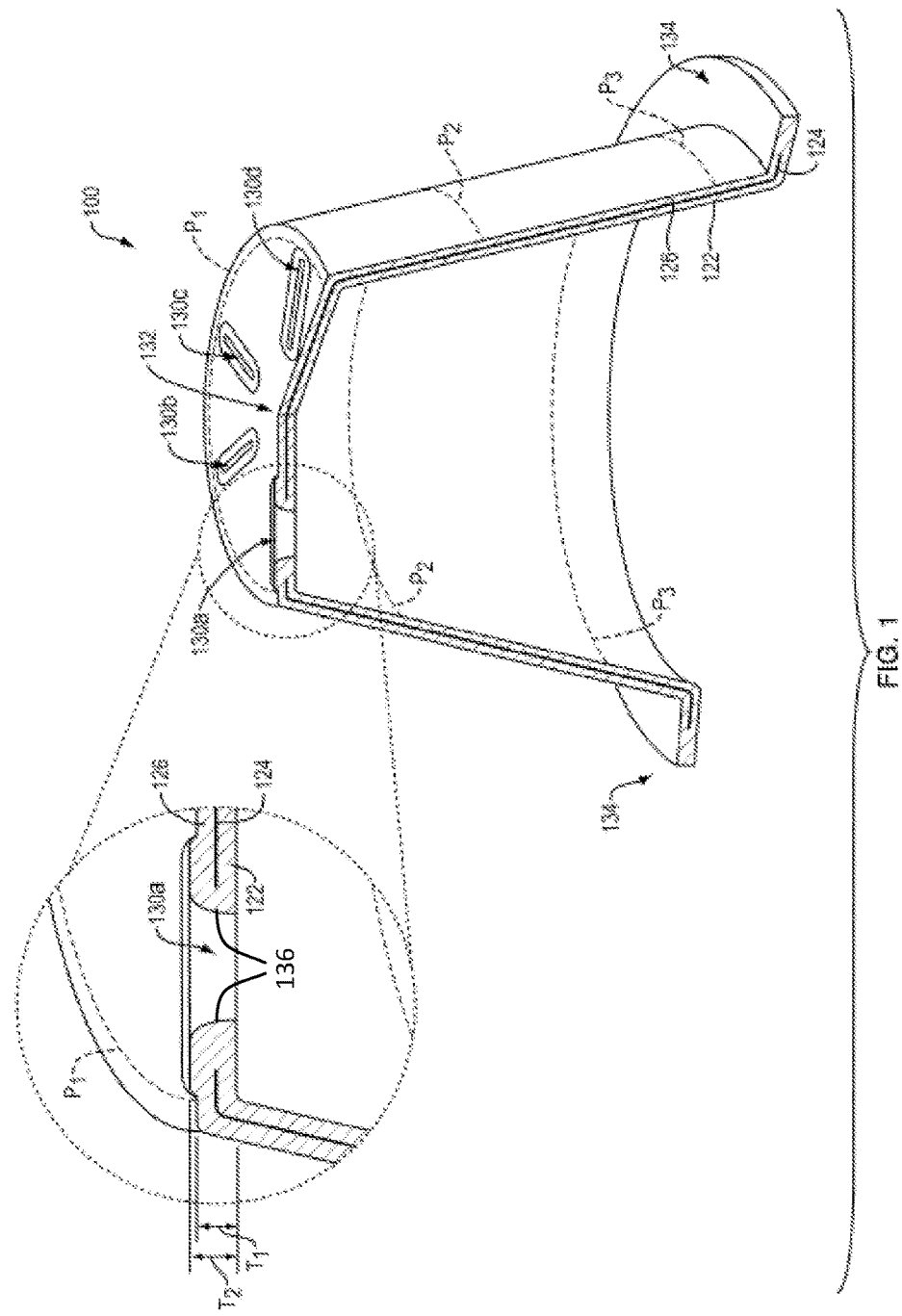
FIG. 1 schematically depicts a perspective sectional view and a detail cross-sectional view of a co-injection molded multi-layer article including apertures disposed between a gate region and a peripheral edge region of the article, in accordance with some embodiments.
Figure 2:
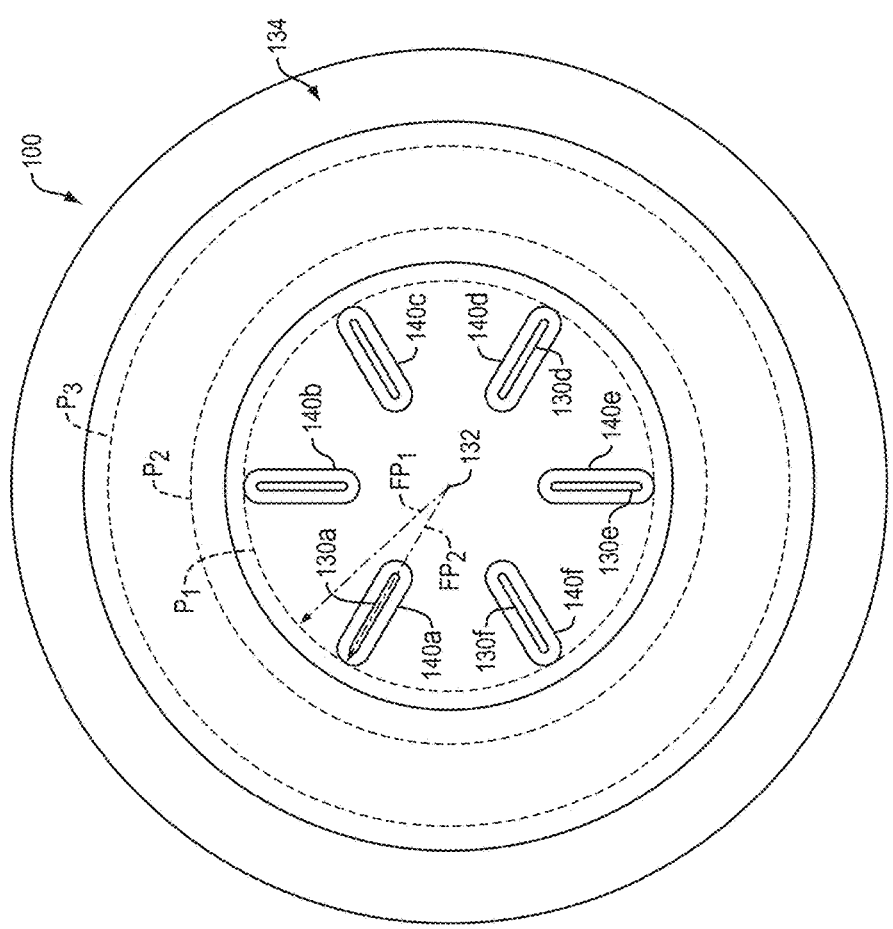
FIG. 2 schematically depicts a top view of the article of FIG. 1.

FIGS. 1 and 2 depict a co-injection molded multilayer article 100, in accordance with some embodiments. The article 100 includes an inner layer 122 and an outer layer 126 that each include a first polymeric material, and an interior layer 124 that includes a second polymeric material disposed between the inner layer 122 and the outer layer 126 (see detail of FIG. 1). The article 100 includes one or more molded apertures (e.g., 130a-130d) disposed between a gate region 132 and a peripheral region 134 (e.g., a rim or an open end) of the article. As depicted in the detail of FIG. 1, the molded apertures 130a extend through the inner layer 122 the outer layer 126 and the interior layer 124 of the article 100. The interior layer 124 is surrounded by the inner layer 122 and the outer layer 126 even at the edges 136 of the apertures 130a-130d.

In some embodiments, the interior layer extends over at least 95% of a perimeter of a cross-section of an open end of the article downstream of the molded apertures 130a-130d. In some embodiments, the interior layer extends over at least 98% of a perimeter of a cross-section of an open end of the article downstream of he molded apertures 130a-130d. In some embodiments, the interior layer extends over at least 99% of a perimeter of a cross-section of the article downstream of the molded apertures 130a-130f. In some embodiments, the interior layer is continuous over a perimeter of a cross-section of the article downstream of the molded apertures 130a-130f. FIGS. 1 and 2 depict various perimeters $P_1$, $P_2$, $P_3$ associated with different cross-sections of the article downstream of the molded apertures 130a-130f. As depicted in the sectional view of FIG. 1, the interior layer 124 extends downstream of the molded apertures 130a-130d. In some embodiments, the article 100 has an increased thickness region 140a-140f, proximal to each aperture 130a-130f. As depicted in FIGS. 1 and 2, the article has a thickness $T_2$ in a region proximal to an aperture 130a at a point along a flow path $FP_2$. The article has a smaller thickness $T_1$ at an equivalent point along a flow path $FP_1$ that is away from all apertures. The increased thickness region proximal to an aperture corresponds to an enhanced velocity region of a mold cavity used to form the article. The enhanced velocity region of a mold cavity modifies the flow of polymeric material proximal to an aperture-forming region of the cavity during injection molding to achieve increased interior layer coverage downstream of the aperture. See explanation of FIGS. 5-16 below.

Figure 3:
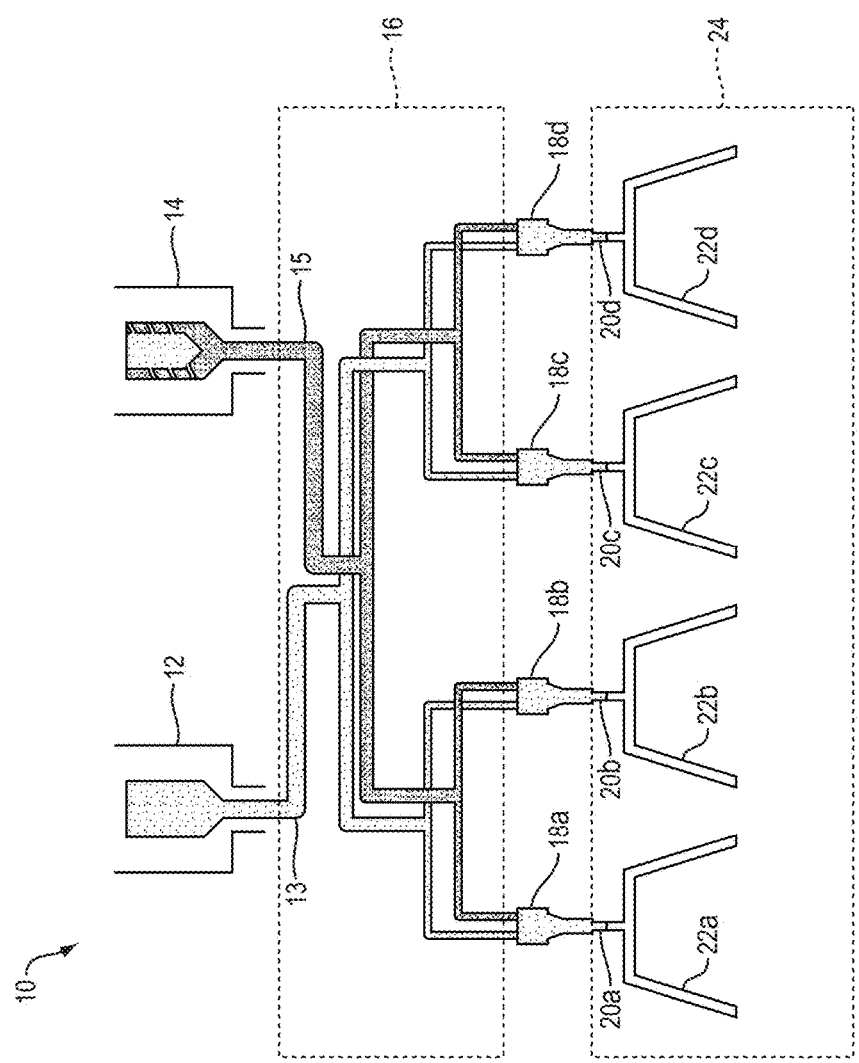
FIG. 3 schematically depicts a co-injection molding system for producing one or more multi-layer molded plastic articles, in accordance with some embodiments.

FIG. 3 schematically depicts a co-injection molding system 10 configured to co-inject at least two polymeric plastic material streams into a mold cavity to produce one or more articles each having multiple co-injected plastic layers and a formed aperture between a gate region and a peripheral edge region of the article. Co-injection molding system 10 includes a first material source 12, and a second material source 14. First material source 12 supplies a first polymeric material for use in forming at least one layer of a resulting molded plastic article. Second material source 14 supplies a second polymeric material for use in forming at least one layer of the resulting molded plastic article. System 10 co-injects multiple streams (e.g., an inner stream, an outer stream, and an interior stream) to form multiple layers of a resulting article. Materials suitable for use with embodiments of the invention include, but are not limited to, polymer-based materials such as, polyethylene terephthalate (PET), ethylene vinyl alcohol (EVOH), MXD6 nylon, polypropylene (PP), and polycarbonates (PC). In many embodiments, the inner and outer streams are the same polymeric material. For example, in some embodiments, the inner and outer streams, which form inner and outer layers, include PET, while an interior stream used to form an interior layer is a material chosen to enhance the overall performance of the resulting article, or to reduce the cost of the resulting article. For example, one or more interior streams for interior layers may include one or more of a barrier material (MXD6 Nylon or EVOH), an oxygen scavenging material, a recycled material, or other performance-enhancing or cost-reducing material. The type of material used for the interior layer/stream is often different from the type of material used for the inner and outer layers/streams.

System 10 may also include a manifold 16 for delivery of polymeric material. In some embodiments, a manifold may consist of separate manifolds for each polymeric material. Co-injection molding system 10 further includes nozzle assemblies 18A, 18B, 18C, 18D and a mold 24. Mold 24 defines gates 20A, 20B, 20C, 20D, and corresponding cavities 22A, 22B, 22C, 22D.

A first polymeric material is extruded from first material source 12 and a second polymeric material is extruded from second material source 14. System 10 includes a first flow channel 13 of manifold 16 configured to distribute the first polymeric material to one or more of nozzles 18A-18D, and a second flow channel 15 of manifold 16 configured to distribute the second polymeric material to one or more of nozzles 18A-18D. First polymeric material and second polymeric material combine into co-polymeric streams in nozzles 18A-18D, which are injected into mold cavities 22A, 22B, 22C, 22D respectively for molding resulting articles. In each nozzle 18A-18D, the first and second polymeric streams are combined to form an annular combined polymeric stream such that the second polymeric material forms an interior core stream in the combined polymeric stream while the first polymeric material forms the inner and outer streams in the combined stream. The inner and outer streams encase the interior core stream as the annular combined polymeric stream is injected from the nozzle. Methods for co-injecting multiple polymeric materials to form plastic articles with multiple layers of different materials are generally known, such as described in U.S. Pat.

No. 6,908,581 and the documents incorporated therein, each of which is also incorporated by reference herein in its entirety. Further details regarding how a combined polymeric plastic stream is produced in the injection nozzle are provided in the description of FIG. 37 below.

Although system 10 is depicted including four nozzle assemblies and a mold that defines four gates (20A-20D), and four cavities (22A-22D) for forming four plastic articles simultaneously, one of ordinary skill in the art will appreciate that other embodiments may include different numbers of nozzle assemblies, gates, and cavities for forming different numbers of plastic articles simultaneously. For example, embodiments may include one, two, three, four, or more than four sets of nozzle assemblies, gates, and cavities. Example embodiments for large scale production systems may include more sets of nozzle assemblies, gates, and cavities (e.g., 64 or more sets).

Figure 4:
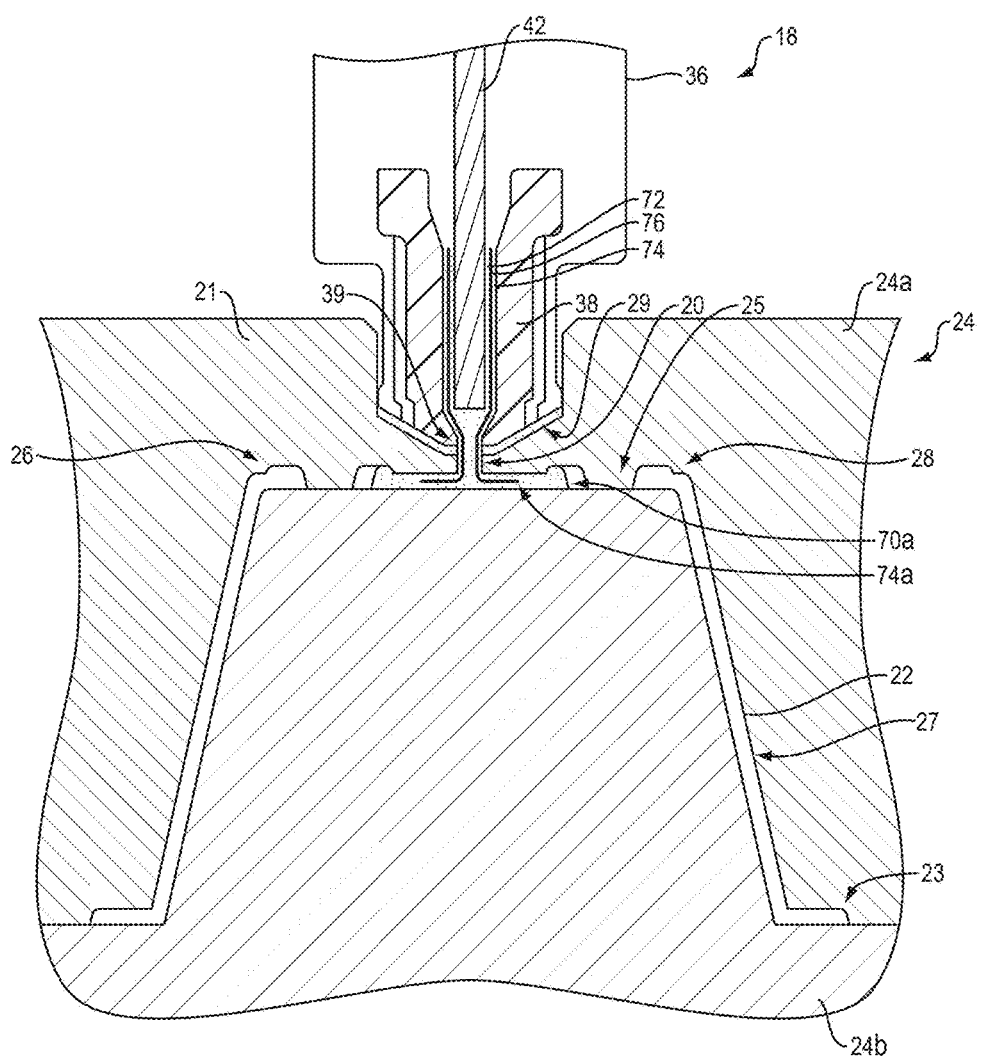
FIG. 4 schematically depicts a cross-sectional view of a portion of an injection nozzle and a mold cavity including an aperture-forming region between a gate region and a peripheral region and an enhanced velocity region in accordance with some embodiments.

FIG. 4 schematically depicts a portion of a nozzle 18, which may be referred to as a nozzle assembly, and a mold 24 that defines at least one cavity 22 corresponding to a shape of a resulting plastic article in accordance with some embodiments. Mold 24 also defines a corresponding gate 20, through which a combined polymeric plastic stream 70 produced by nozzle 18 flows into cavity 22.

Nozzle assembly 18 includes a nozzle body 36, a nozzle tip 38, and a valve pin 42. Nozzle tip 38 includes an output portion 39 (also referred to as an egress part of the nozzle) capable of communicating with cavity 22 to inject a combined polymeric plastic stream 70 into cavity 22. In some embodiments, the nozzle tip 38 may be separated from the gate 20 of the mold 24 by a gap 29 (e.g., a 1.5 mm separation between the output portion 39 of the cavity and the gate 20 of the mold). After the first molding cycle, much of the gap 29 is filled with polymer material (e.g., a skin material) as depicted. Valve pin 42 can control flow of combined polymeric plastic stream 70 from output portion 39 into cavity 22 through gate 20. In FIG. 4, the valve pin 42 is depicted in a retracted position allowing the combined polymer stream 70 to flow into the cavity 22. The combined polymeric stream 70 includes an interior stream 74 of a second polymeric material between an inner stream 72 and an outer stream 74 of a first polymeric material.

As depicted in FIG. 4, in co-injection molding an article with an interior layer between an inner layer and an outer layer, the flow front of the combined inner and outer streams (referred to herein as the skin flow leading edge 70a), leads the flow front of the interior stream 74a (referred to herein as the interior stream flow leading edge 74a).

A region of cavity 22 proximal to gate 20 is referred to as a gate region 21. The region of the cavity furthest from the gate region 21 as measured along the flow paths is referred to as the peripheral region or peripheral edge 23. Cavity 22 includes an aperture-forming region 25 located between the gate region 21 and the peripheral region 23. The aperture-forming region 25 is configured to form a molded aperture in the resulting article. Cavity 22 also includes an enhanced velocity region 26 proximal to the aperture-forming region 25. The enhanced velocity region 26 is configured to increase a flow velocity of a combined stream to enhance interior layer coverage in the resulting article downstream of the aperture. An explanation of the function of the enhanced velocity region is provided below with respect to FIGS. 5-16.

As depicted, in some embodiments, the cavity 22 may include a sidewall portion 27 and/or may include a base portion 28. Although the aperture-forming region 25 and enhanced velocity region 26 are disposed in the base portion as depicted in FIG. 4, in other embodiments, the aperture-forming region and the enhanced velocity region may be disposed in the sidewall portion. In some embodiments, one or both of the aperture-forming region and the enhanced velocity region may extend from the base portion to the sidewall portion. In some embodiments, different aperture-forming regions and associated enhanced velocity regions may be disposed in different portions of the cavity.

As depicted, mold 24 may include a first mold portion 24a and a second mold portion 24b. A co-injection molded article produced by system 10 may be released from mold 24 by separating second mold portion 24b from first mold portion 24b.

In FIGS. 3 and 4 the first polymeric material is indicated with dots and the second polymeric material is indicated with solid shading for illustrative purposes. One of skill in the art will recognize that either or both of first polymeric material and second polymeric material may have an appearance that is translucent, transparent, opaque, uniform, non-uniform, or any combination of the aforementioned.

Figure 5:
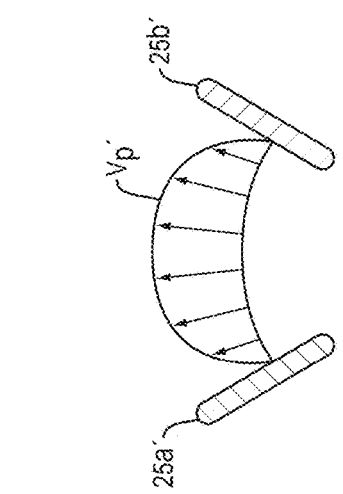
FIG. 5 schematically depicts a plan view of a flow velocity profile along a midline of flow for a portion of a cavity that does not include enhanced-velocity regions as fluid passes between a first aperture-forming region and a second aperture-forming region in the cavity.

FIG. 5 schematically depicts the flow velocity Vp' of a fluid stream along a midline of the cavity flow path as the fluid stream passes between a two aperture-forming regions 25a' and 25b'. As depicted by the size of the arrows associated with the flow velocity curve Vp', at the aperture-forming regions 25a' and 25b' the flow velocity is reduced to zero, but away from the aperture-forming regions 23b' and 25b' the flow velocity increases to a value less affected by, or unaffected by, the presence of the aperture-forming regions 25a' and 25b'. The value that the flow velocity would have in the absence of aperture-forming regions is referred to as the nominal flow velocity. When co-injection molding to form an interior layer between inner and outer layers, this reduction of the flow velocity near the aperture-forming regions from the nominal flow velocity creates large gaps in the interior layer downstream of the apertures.

Figure 6:
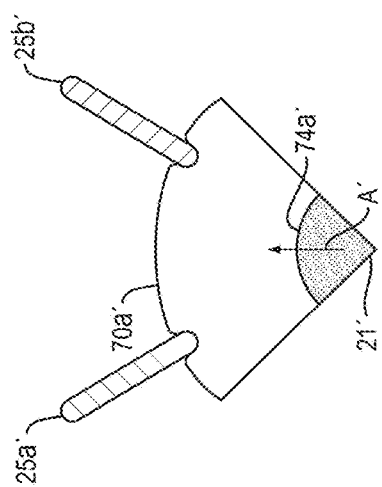
FIG. 6 schematically depicts a plan view of the portion of the cavity of FIG. 5 with a leading edge of a first material flow and a leading edge of a second material flow interacting with the first aperture-forming region and the second aperture-forming region.

FIGS. 6-10 depict how the aperture-forming regions 25a' and 25b' affect the leading edge of the skin flow (also known as the first material flow before splitting into the inner and outer flow streams) 70a' and the leading edge of the interior stream flow (also known as the second material flow) 74a' during injection molding. The fluid initially flows outward from the gate region 21', as shown by arrow A'. For simplicity, only two aperture-forming regions and a quarter of the cavity are depicted. FIG. 6 depicts the skin flow leading edge 70a' as it initially encounters the aperture-forming regions 25a' and 25b'. The interior stream flow leading edge 74a' is not yet noticeably affected by the aperture-forming regions 25a' and 25b'.

Figure 7:
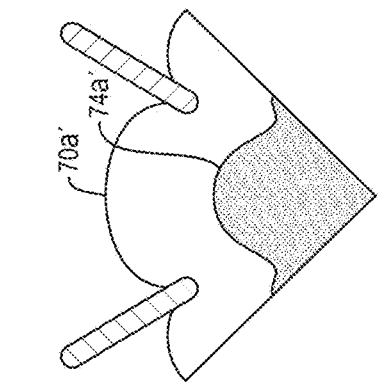
FIG. 7 schematically depicts the interaction of the leading edge of the first material flow and the leading edge of the second material flow with the first aperture-forming region and the second aperture-forming region at a later time than FIG. 6.
Figure 9:
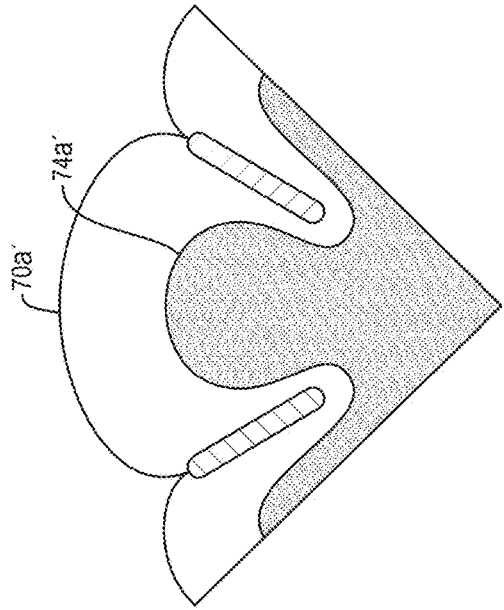
FIG. 9 schematically depicts the distortion of both the leading edge of the first material flow and the leading edge of the second material flow due to interaction with the aperture-forming regions at a later time than FIG. 8.
Figure 8:
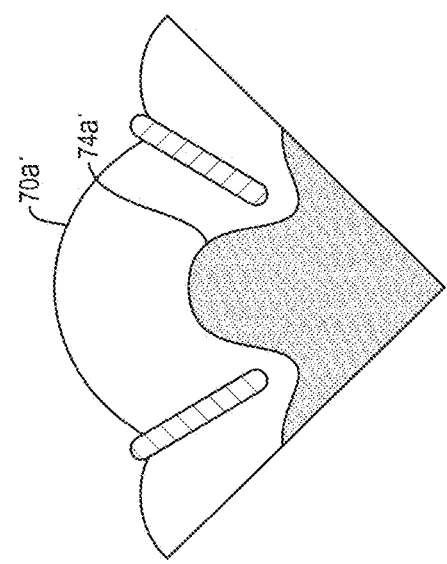
FIG. 8 schematically depicts the leading edge of the first material flow and the leading edge of the second material flow at a later time than FIG. 7 when the leading edge of the first material flow reaches the far edge of the aperture-forming regions.
Figure 10:
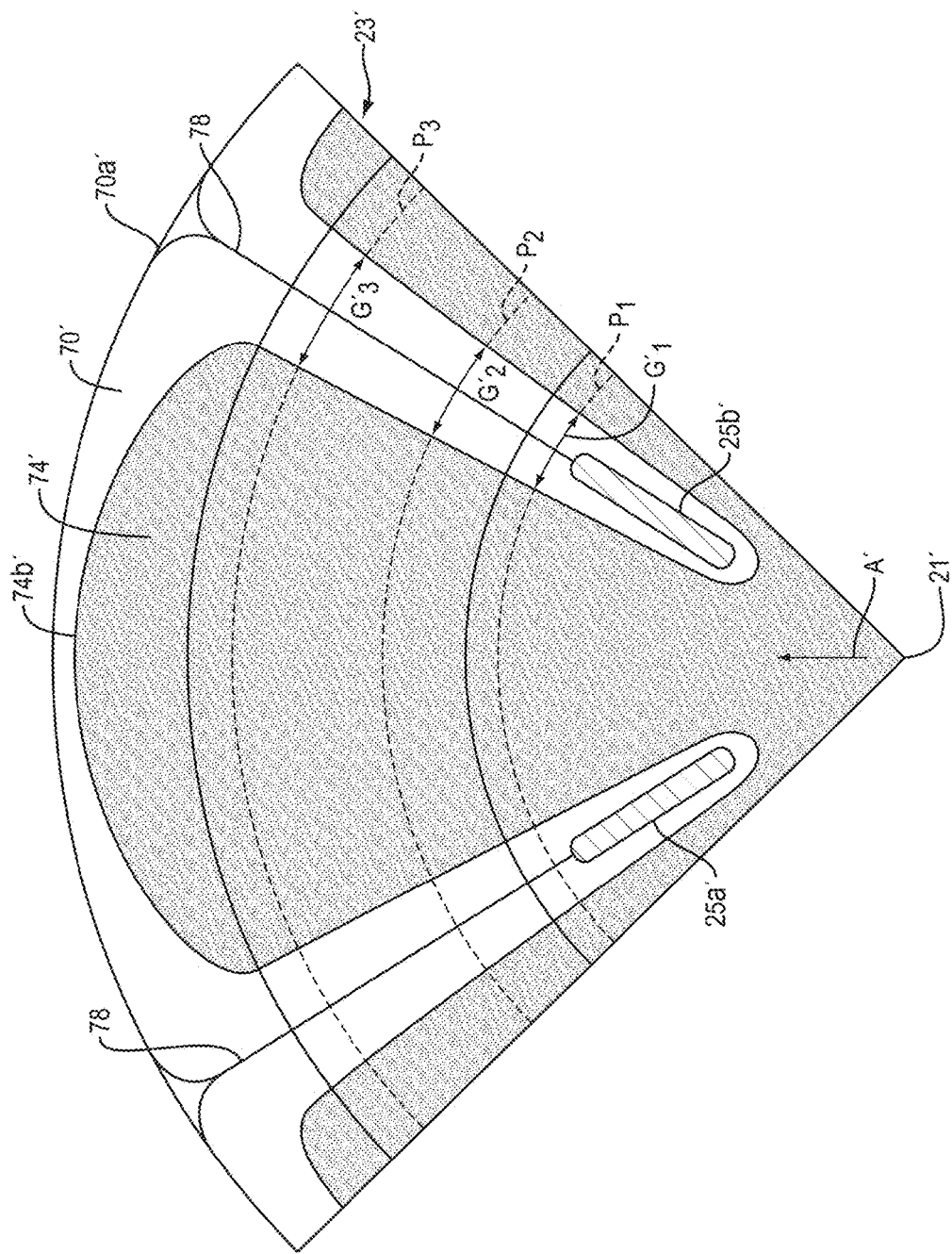
FIG. 10 schematically depicts a plan view of the portion of the cavity along a midline of the flow when the injection phase is almost complete illustrating the gaps in the interior layer coverage downstream of the aperture-forming region.

FIG. 7 depicts a later time at which the skin flow leading edge 70a' and the interior stream flow leading edge 74a' exhibit significant shape distortion due to the cumulative effect over time of the reduction in flow velocity near the aperture-forming regions 25a', 25b'. FIGS. 8 and 9 depict the increasing distortion of both the skin flow leading edge 70a' and of the interior stream flow leading edge 74a'. Downstream of the aperture-forming regions 25a' and 25b' the velocity of the skin flow leading edge downstream of an aperture-forming region 25a', 25b' is significantly slower than the velocity of the of the skin flow leading edge along a flow path far from the aperture-forming regions 25a' and 25b'. FIG. 10 depicts a section of the mold when the filling phase of injection is nearly complete. As depicted, the skin flow 70' fills in the cavity downstream of the aperture-forming areas 25a', 25b' forming weld line seams 78; however, due to the distortion in the shape of the flow fronts and the reduced flow velocity in the wake of the aperture-forming regions 25a, 25b, the interior stream flow (also known as the second material flow) 74' does not extend into the portion of the cavity directly downstream of the aperture.

As depicted in FIG. 10 the presence of aperture-forming regions 25a', 25b' between a gate region 21' and a peripheral region 23' of a cavity can create significant gaps in coverage of an interior layer downstream of the aperture forming regions. At a first perimeter $P_1'$ downstream of aperture-forming region 25b', the size of the gap in interior layer coverage is $G_1'$. At a second perimeter $P_2'$ downstream the size of the gap grows to $G_2'$, and at a third perimeter $P_3'$ further downstream the size of the gap grows further to $G_3'$.

Figure 11:
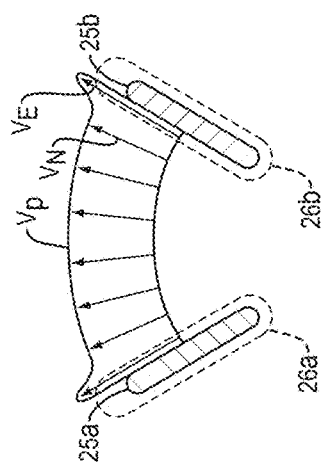
FIG. 11 schematically depicts a plan view of a flow velocity profile along a midline of flow between a first aperture-forming region and associated enhanced velocity region and a second aperture-forming region and associated enhanced velocity region, in accordance with some embodiments.

FIGS. 11-16 depict how an enhanced velocity region proximal to the aperture-forming region can be used to reduce the gap in interior layer coverage (or increase interior layer coverage) downstream of an aperture-forming region. As explained below, the gaps may be significantly reduced to a small percentage of the total surface area, or the gaps may be closed with an interior layer actually bridging the gap. FIG. 11 schematically depicts the flow velocity profile $V_p$, of a fluid stream along a midline of the cavity flow path as the fluid stream passes between a two aperture-forming regions 25a and 25b, with the cavity including an enhanced velocity region 26a, 26b proximal to each aperture-forming region. The arrows associated with the flow velocity profile $V_p$ depict the magnitude of the flow velocity along different flow paths.

At or in the aperture-forming regions 25a, 25b the flow velocity is reduced to zero because no fluid can travel through the aperture-forming regions 25a, 25b. In contrast, along flow paths away from the aperture-forming regions, the flow velocity is at or near the value it would have if there were no aperture-forming regions (referred to herein as the nominal flow velocity $V_N$). Flow paths away from the aperture-forming regions may be described as flow paths that do not pass through the aperture forming regions or through the enhanced velocity regions.

The enhanced velocity regions 26a, 26b, which are proximal to the aperture-forming regions, at least partially compensate for the flow velocity being reduced to zero in the aperture forming regions. Specifically, in the enhanced velocity regions 26a, 26b, the resistance to flow along the flow path is decreased (e.g., by increasing a thickness of the cavity) which increases the velocity of the flow in the region. In the enhanced velocity regions 26a, 26b, the fluid velocity increases sharply from zero at the aperture-forming regions 25a, 25b to a velocity $V_E$ higher than the nominal flow velocity, before falling back to the nominal velocity $V_N$ away from the enhanced velocity regions 26a, 26b. This enhancement of the flow velocity near the aperture-forming regions allows the flow velocity downstream of an aperture-forming region to be similar to, or greater than, the flow velocity along a flow path located away from the aperture-forming region and unaffected by the aperture-forming region, which reduces the flow front distortion of both the skin flow leading edge 70a and of the interior stream flow leading edge 74a directly downstream of the aperture forming region as depicted in FIGS. 12-15 below.

Figure 12:
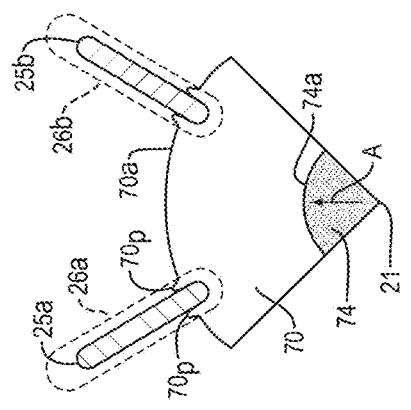
FIG. 12 schematically depicts a plan view of the portion of the cavity of FIG. 11 with a leading edge of a first material flow and a leading edge of a second material flow interacting with the first aperture-forming region, the second aperture-forming region, and the respective associated enhanced velocity flow regions, in accordance with some embodiments.
Figure 13:
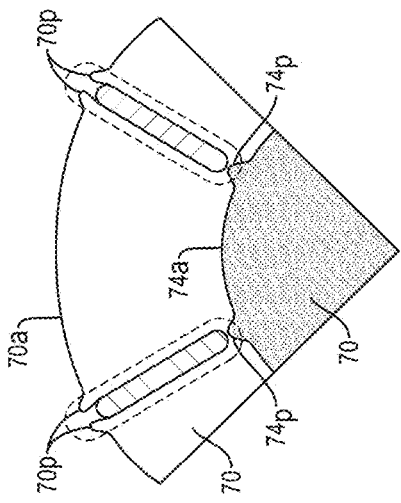
FIG. 13 schematically depicts the interaction of the leading edge of the first material flow and the leading edge of the second material flow with the first aperture-forming region, the second aperture-forming region and the respective associated enhanced velocity flow regions at a later time than FIG. 12, in accordance with some embodiments.

FIG. 12 schematically depicts the skin flow leading edge 70a and the interior stream leading edge 74a as the skin flow 70 is first encountering the aperture-forming regions 25a, 25b. The fluid initially flows outward from the gate region 21, as shown by arrow A. In the enhanced velocity region 26a, 26b, the flow front includes protrusions 70p due to the higher flow velocity in the enhanced velocity region 6a, 26b. In FIG. 13 at a later time relative to FIG. 12, the skin flow front 70a has further progressed and the protrusions 70p are extending downstream beyond the aperture-forming regions 25a, 25b and turning toward each other. The interior stream flow leading edge 74a also includes protrusions 74p in the enhanced velocity regions 26a, 26b.

Figure 14:
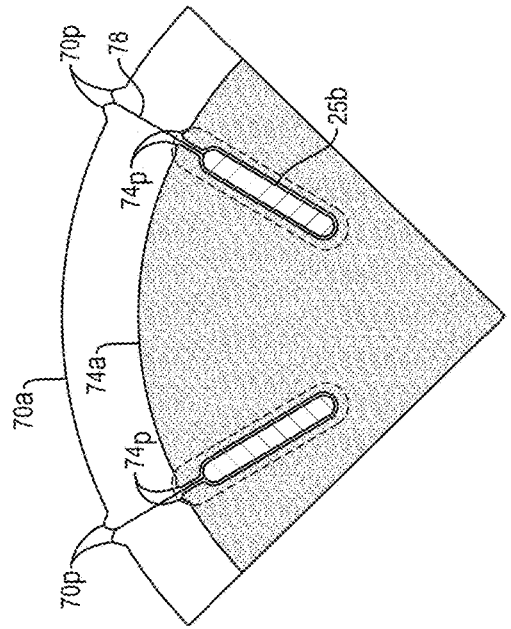
FIG. 14 schematically depicts the leading edge of the first material flow and the leading edge of the second material flow at a later time than FIG. 13 when the leading edge of the first material flow has passed the first aperture-forming region and the second aperture-forming region forming seams downstream of the aperture-forming regions, in accordance with some embodiments.

At a later time in FIG. 14, skin flow leading edge protrusions 70p have joined together to form a weld line seam 78 downstream of each aperture-forming region. Other than the weld line seam 78, the skin flow leading edge 70a appears uniform and largely unperturbed. The interior stream flow leading edge protrusions 74p are increasing in size in the enhanced velocity regions 76a, 76b.

Figure 15:
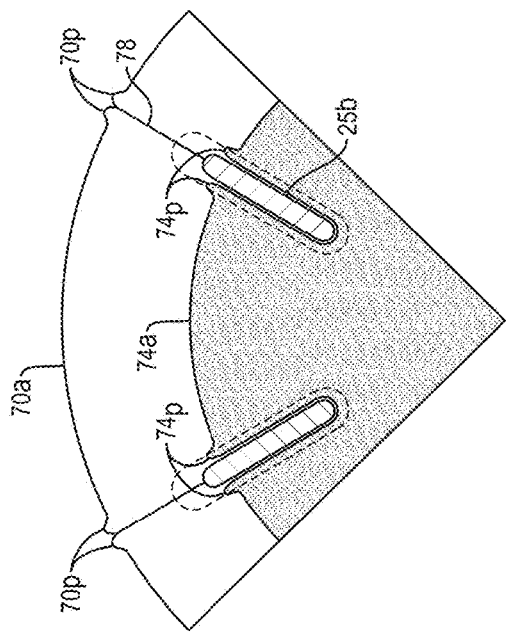
FIG. 15 schematically depicts the overall uniformity of most of the leading edge of the first material flow and most of the leading edge of the second material flow after the leading edges have substantially moved beyond the first aperture-forming region and the second aperture-forming region, in accordance with some embodiments.

In FIG. 15, at a later time, the skin flow leading edge 70a continues expanding outward with a relatively unperturbed shape other than weld line seams 78. The interior stream flow leading edge protrusions 74p extend beyond the aperture-forming region 25b and have turned toward each other. In some embodiments, downstream of the aperture-forming region, the interior stream flow protrusions 74p do not join together because they are separated by the skin flow seam 78. However, in some embodiments with higher levels of enhanced velocity in regions 26a, 26b, the interior layer bridges the skin flow seam to provide a continuous interior layer.

Figure 16:
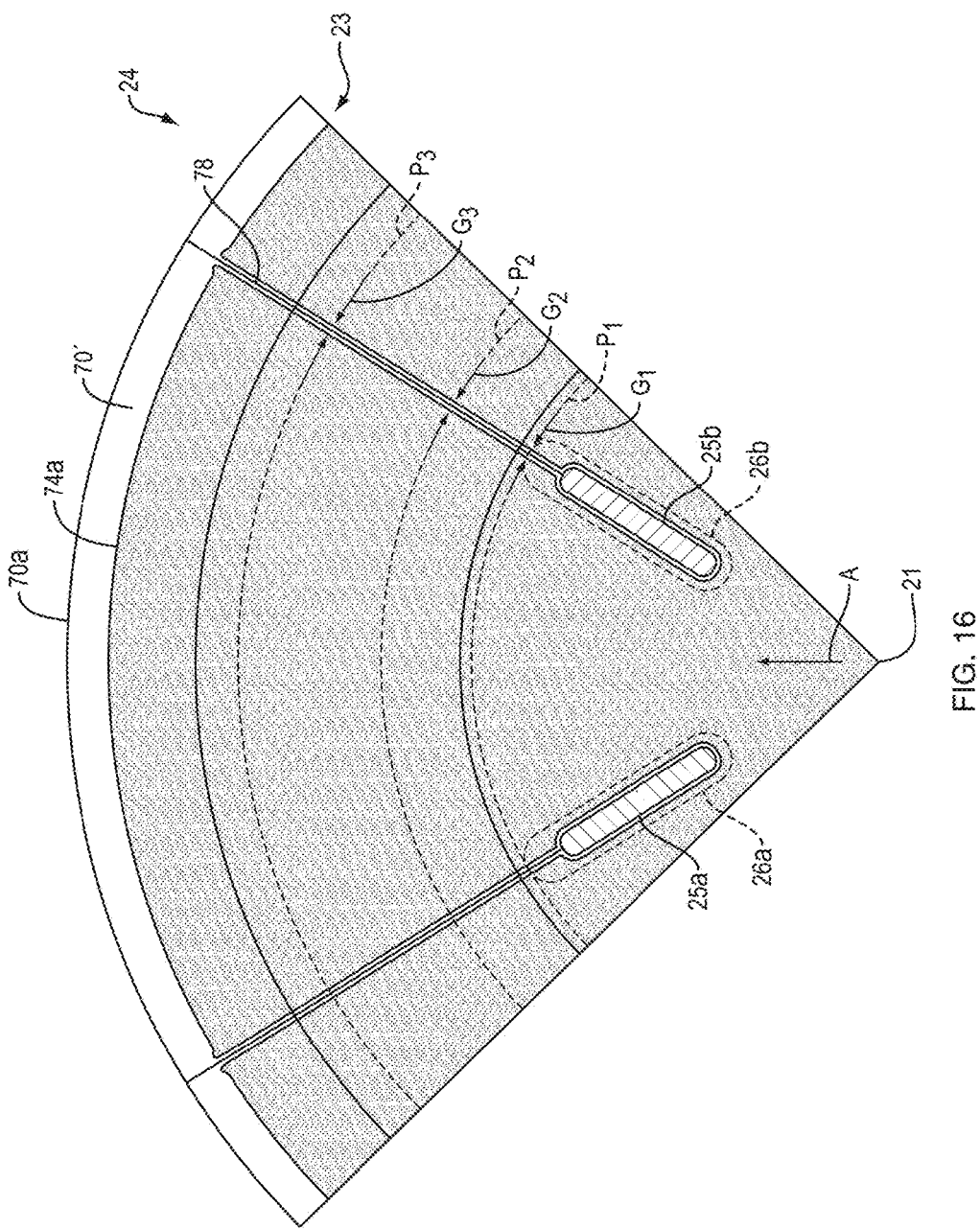
FIG. 16 schematically depicts a plan view of the portion of the cavity along a midline of the flow when the injection phase is complete illustrating the uniformity of the position of the leading edge of the first material flow and the uniformity of the position of the second material flow and the relatively small gaps in the interior layer coverage downstream of the aperture-forming region, in accordance with some embodiments.

FIG. 16 depicts the cavity 24 at the end of the filling cycle. As depicted, the enhanced velocity regions 26a, 26b have greatly reduced the gap in interior layer coverage at the first perimeter ($G_1$ at $P_1$), at the second perimeter ($G_2$ at $P_2$), and at the third perimeter ($G_2$ at $P_3$).

The enhanced velocity region has different parameters that can be adjusted to achieve the desired interior layer coverage downstream of the aperture-forming region. For example, the lateral extent of the enhanced velocity region may be adjusted. As another example, the distance that the enhanced velocity region extends upstream and/or downstream of the aperture-forming region may be varied. The height of the channel in the enhanced velocity region, also referred to as the thickness of the cavity, may be adjusted. FIGS. 17-20 depict views of aperture-forming regions 202, 206, 210 and associated enhanced velocity regions 204, 208, 212 respectively. In FIG. 17, the aperture-forming region 202 is elongated along an axis A parallel to a flow path F. The enhanced velocity region 203 is roughly rectangular having a length L along the flow path and a width W. The length L and width W may be adjusted to achieve a desired flow velocity profile downstream of the aperture-forming region. The cavity thickness and length L and width W of the enhanced velocity region combine to create the desired flow.

FIG. 18 schematically depicts an aperture-forming region having a wedge shape 206 with a corresponding enhanced velocity region extending laterally a distance $S_1$ from the aperture-forming region 206 and extending downstream a larger distance $S_2$ from the aperture-forming region 208.

FIG. 19 schematically depicts a portion of a mold cavity 240 with a diamond shaped aperture-forming region 310 with an associated enhanced velocity region 312. In each of FIGS. 17, 18, and 19, the aperture-forming region is elongated along an axis A that is roughly oriented with an incoming flow direction. In other embodiments, an aperture-forming region may not be elongated, or an axis of elongation may not be parallel to an incoming flow direction. However, generally speaking, the greater the angle between an axis of elongation of an aperture-forming region and the incoming flow direction, the greater the distortion of the leading edge shape downstream of the aperture-forming region.

FIG. 20 depicts a side cross-sectional view of the mold cavity 324 having the aperture-forming region 206 of FIG.

19. As depicted, the cavity has a thickness $h_1$ immediately upstream of the enhanced velocity region 208, which increases to a thickness $h_2$ in the enhanced velocity region upstream of the aperture-forming region 206. The cavity has a thickness $h_3$ in the enhanced velocity region 208 downstream of the aperture-forming region 206, which decreases to a thickness $h_4$ beyond the enhanced velocity region 208. In some embodiments, the enhanced velocity region has a uniform thickness (e.g., $h_2=h_3$). In some embodiments, a thickness of the enhanced velocity region varies laterally and/or downstream. In some embodiments the thickness immediately upstream of the enhanced velocity region is the same as the thickness immediately downstream of the enhanced velocity region (e.g., $h_1=h_4$). In some embodiments, the thickness immediately downstream of the enhanced velocity region is different than the thickness immediately upstream of the enhanced velocity region (e.g., $h_1 \neq h_4$). In some embodiments, the enhanced velocity region creates a projection on an outward facing surface of the resulting article. In some embodiments, the enhanced velocity region creates a projection on an inward facing surface of the resulting article. In some embodiments, the enhanced velocity region creates projections on both an inward facing surface and on an outward facing surface of the resulting article.

Figure 21:
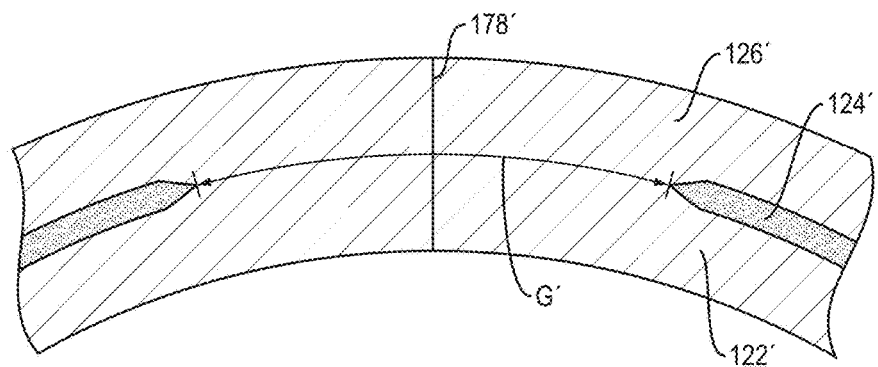
FIG. 21 schematically depicts a cross-sectional view of a portion of a co-injected article downstream of a formed aperture depicting a large gap in interior layer coverage over a perimeter of a cross-section of the article.

FIG. 21 schematically depicts a cross-section of a multilayer article taken between a gate region and a peripheral edge region of the article and downstream of a formed aperture, where the article was produced with a mold having an aperture-forming region, but no associated enhanced velocity flow region. As depicted by the cross-section, the leading edge of the first material has filled in to form a combined inner layer 122' and outer layer 126' with a seam 178' downstream of the formed aperture, but there is a significant gap G' in the interior layer 124' downstream of the formed aperture.

Figure 22A:
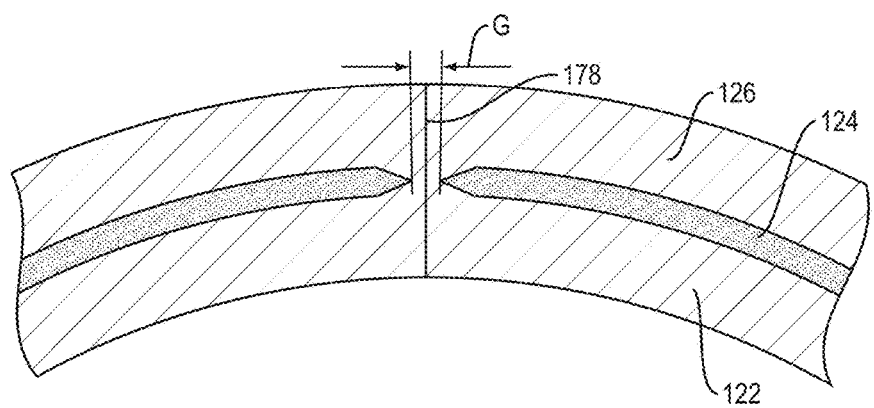
FIG. 22A schematically depicts a cross-sectional view of a portion of a co-injected article downstream of a formed aperture with a proximal increased thickness region depicting a relatively small gap in interior layer coverage over a perimeter of a cross-section of the article, in accordance with some embodiments.

In contrast, FIG. 22A schematically depicts a cross-section of the multilayer article 100 produced using a cavity including an aperture-forming region between a gate region and a peripheral edge region and an associated enhanced velocity flow region. As depicted by the cross-section, the leading edge of the first material has filled in to form a combined inner layer 122 and outer layer 126 with a weld line seam 178 downstream of the formed aperture. The leading edge of the second material has also filled in downstream of the formed aperture as well forming a relatively small gap G in the interior layer 124 coverage downstream of the formed aperture. This gap corresponds to less than 1% of the overall perimeter of article in this cross-section, in accordance with some embodiments.

Figure 22B:
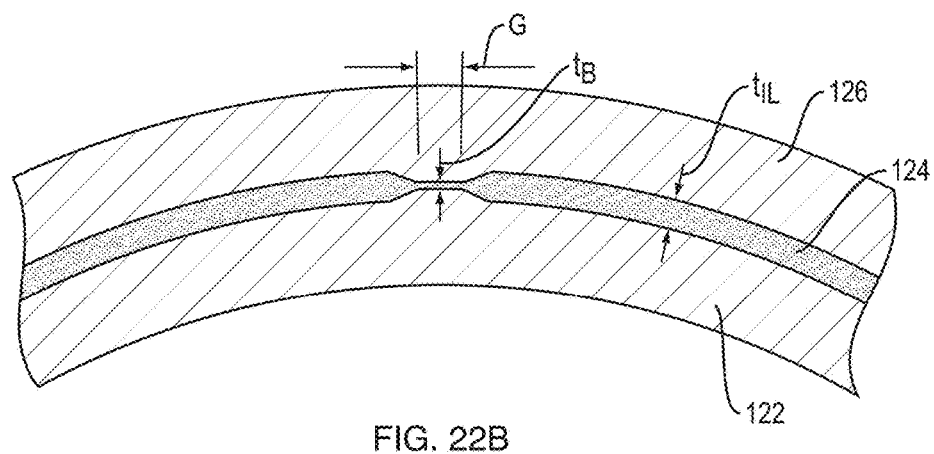
FIG. 22B schematically depicts a small gap with the interior layer bridging the gap.

FIG. 22B depicts a cross-section of a resulting multilayer article downstream of an aperture in an embodiment where the enhanced flow region provided a greater enhancement of flow than in the embodiment shown in FIG. 22A. In the embodiment of FIG. 22B, the increased flow enhancement resulting in gap G being bridged by the interior layer 124. The interior layer has a thickness $t_{IL}$ away from the gap and a smaller thickness $t_B$ where the gap is bridged.

Figure 22C:
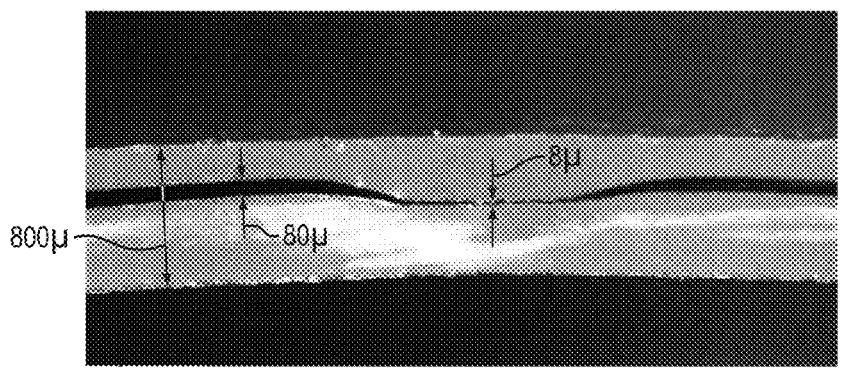
FIG. 22C is an image of a cross-section of an article wall downstream of an aperture where the interior layer bridges the gap.

FIG. 22C is an image of a cross-section of a sidewall of an example multilayer article downstream of an aperture. The image shows a gap that is bridged by an interior layer. In this example, an overall thickness of the sidewall is 800 μm, with a nominal interior layer thickness $t_{IL}$ away from the gap of 80 μm. At the bridged gap, the bridging portion of the interior layer has a reduced thickness $t_B$ of 80 μm.

In an example where EVOH is used as an interior barrier layer between inner and outer layers of PP, bridging the gap by the interior layer significantly reduces permeation of oxygen through the article wall, even where the thickness of the bridging portion of the interior layer $t_B$ is significantly thinner than the nominal thickness of the interior layer $t_{IL}$ as explained below.

To depict the impact of bridging of the gap with an interior barrier layer on oxygen permeation into an article, relative permeation rates are calculated and compared below for an example article with no bridging of the gap, and for an example article with bridging of the gap with an interior layer portion having a significantly reduced thickness as compared with a nominal thickness of the interior layer. A rate of permeation of gas (e.g., oxygen) through a unit area of a layer (Q) is proportional to the permeability coefficient of oxygen through the material of the layer (P) divided by the thickness of the layer (t).

$$Q \propto \frac{P}{t}$$

For both examples compared below, the article has 0.5 mm total thickness of PP inner and outer layers and an EVOH interior layer with a nominal thickness of 10 μm. The permeability coefficient of PP for oxygen is about 90 cc $O^2$ ·mm/(m²·day·atm). Thus, the rate of permeation of oxygen through the PP layer can be described by the following equation.

$$Q_{PP} \propto \frac{PP_{PP}}{t_{PP}} = \frac{90 \text{ cc } O_2 \cdot \text{mm}/(\text{m}^2 \cdot \text{day} \cdot \text{atm})}{0.5 \text{ mm}} = 180 \frac{\text{cc } O_2}{\text{m}^2 \cdot \text{day} \cdot \text{atm}}$$

The permeability coefficient of EVOH for oxygen is about 0.01 cc $O^2$ ·mm/(m²·day·atm). Thus, the rate of permeation of oxygen through the nominal 10 μm thick EVOH layer can be described by the following equation.

$$Q_{EVOH,nominal} \propto \frac{PP_{EVOH}}{t_{EVOH,nominal}} = \frac{0.01 \text{ cc } O_2 \cdot \text{mm}/(\text{m}^2 \cdot \text{day} \cdot \text{atm})}{0.01 \text{ mm}} = 1 \frac{\text{cc } O_2}{\text{m}^2 \cdot \text{day} \cdot \text{atm}}$$

For one example, a portion of the EVOH interior layer that bridges each gap is 1 μm thick. For the 1 μm thick gap bridging portion of the EVOH interior layer, the rate of permeation of oxygen can be described by the following equation.

$$Q_{EVOH,gb} \propto \frac{PP_{EVOH}}{t_{EVOH,gb}} = \frac{0.01 \text{ cc } O_2 \cdot \text{mm}/(\text{m}^2 \cdot \text{day} \cdot \text{atm})}{0.001 \text{ mm}} = 10 \frac{\text{cc } O_2}{\text{m}^2 \cdot \text{day} \cdot \text{atm}}$$

In the first example, labeled Example A, there is no gap bridging by the EVOH interior layer, and the 10 μm thick interior layer covers 99% of the surface area of a sealable portion of an article. The calculation of the overall permeation rate of oxygen through a unit area of the Example A article is shown below. It should be noted that the permeability coefficient of PP for oxygen is about 9000 times the permeability coefficient of EVOH for oxygen. As such, where there is an EVOH layer, the EVOH layer determines the overall permeability through the article at that location.

$$Q_{overall,Ex\ A} = (Q_{EVOH,nom} \times 0.99) + (Q_{PP} \times 0.01) \propto$$

$$\left(1\frac{cc\ O_2}{m^2 \cdot day \cdot atm} \times 0.99\right) + \left(180\frac{cc\ O_2}{m^2 \cdot day \cdot atm} \times 0.01\right)$$

$$Q_{overall,Ex\ A} \propto 2.79\frac{cc\ O_2}{m^2 \cdot day \cdot atm}$$

In the second example, labeled Example B, there is a 1 μm thick portion of the interior layer bridging the gap by covering the 1% of the surface area of the sealable portion of the article that does not include the 10 μm this interior layer. The calculation of the overall permeation rate of oxygen through a unit area of the Example B article is shown below.

$$Q_{overall,Ex\ B} = (Q_{EVOH,nom} \times 0.99) + (Q_{EVOH,gb} \times 0.01) =$$

$$\left(1\frac{cc\ O_2}{m^2 \cdot day \cdot atm} \times 0.99\right) + \left(10\frac{cc\ O_2}{m^2 \cdot day \cdot atm} \times 0.01\right)$$

$$Q_{overall,Ex\ B} \propto 1.09\frac{cc\ O_2}{m^2 \cdot day \cdot atm}$$

Thus, bridging a gap in a 10 μm thick EVOH interior layer with just a 1 μm thick EVOH bridging portion reduces the overall oxygen permeation significantly, by about 61% in this example.

As another example, depicts how unbridged gaps in a barrier layer affect overall gas permeation for an example article, specifically a cup with inner and outer PP layers, an interior EVOH layer, and a sealable area. The example cup has 0.4 mm wall thickness, and a sealable area of 2500 mm². The table below illustrates how gap width and gap area relate to the total permeation into the cup for barrier layers of various thicknesses. In this example the gaps are not bridged by an interior layer.

| | | | | Average Barrier Layer Thickness in Cup | | | | |
|---|---|---|---|---|---|---|---|---|
| | | | | 3% | 4% | 5% | 6% | 7% |
| Gap width mm (10 gaps in sidewall) | Gap Area mm² | Internal Layer Coverage | $Q_{gap}$ cc/day | 12 μm $Q_{total}$ cc/day | 16 μm $Q_{total}$ cc/day | 20 μm $Q_{total}$ cc/day | 24 μm $Q_{total}$ cc/day | 28 μm $Q_{total}$ cc/day |
| 0.00 | 0.0 | 100% | 0 | 0.0004 | 0.0003 | 0.0003 | 0.0002 | 0.0002 |
| 0.03 | 7.8 | 99.7% | 0.0004 | 0.0008 | 0.0007 | 0.0006 | 0.0006 | 0.0006 |
| 0.05 | 15.5 | 99.4% | 0.0007 | 0.0012 | 0.0011 | 0.00010 | 0.0009 | 0.0009 |
| 0.10 | 31.0 | 98.8% | 0.0015 | 0.0019 | 0.0018 | 0.0017 | 0.0017 | 0.0016 |
| 0.15 | 46.5 | 98.1% | 0.0022 | 0.0026 | 0.0025 | 0.0025 | 0.0024 | 0.0024 |
| 0.20 | 62.0 | 97.5% | 0.0029 | 0.0034 | 0.0032 | 0.0032 | 0.0031 | 0.0031 |
| 0.30 | 93.0 | 96.3% | 0.0044 | 0.0048 | 0.0047 | 0.0046 | 0.0046 | 0.0046 |
| 0.40 | 124.0 | 95.0% | 0.0059 | 0.0063 | 0.0062 | 0.0061 | 0.0061 | 0.0060 |

PERMEATION AND THE EFFECT OF GAPS IN THE BARRIER LAYER FOR THE EXAMPLE CUP

For some cups (e.g., individual serving cups holding ground coffee beans) a permeation limit for total permeation into the cup may be 0.003 cc/day. Based on the table above, to achieve a total permeation into the example cup of less than the 0.003 cc/day limit, the internal layer coverage must be at least about 98.1%, meaning that the unbridged gaps must be less than 1.9% of the total surface area. For 98.1% coverage, even if the nominal interior layer thickness is only 12 μm, the total permeation is still under the 0.003 cc/day limit. For gap areas of 97.5% and larger, regardless of the average thickness of the barrier layer, the total permeation per day is larger than the limit of 0.003 cc/day because 0.0029 cc/day diffuses through the gap area alone.

The parameters of an enhanced velocity region for achieving sufficient interior layer coverage downstream of an aperture-forming region can be determined experimentally, or by simulation and modeling. For example, the inventors used an injection molding simulation program to model flow velocity profiles in a mold cavity for an article similar to that depicted in FIG. 1. Specifically, the inventors used the simulation program Simulation MOLDFLOW from AUTODESK, Inc. of San Rafael, Calif. The inventors varied several dimensions of the enhanced velocity region and compared the flow velocity along a first flow path downstream of an aperture-forming region and the flow velocity at a corresponding position along a second flow path far from an aperture-forming region. If the flow velocity along the first flow path downstream of the aperture-forming region was similar to, or greater than, the flow velocity at a corresponding point along the second flow path, the enhanced velocity region would significantly increase the interior layer coverage downstream of the aperture-forming region.

Figure 23:
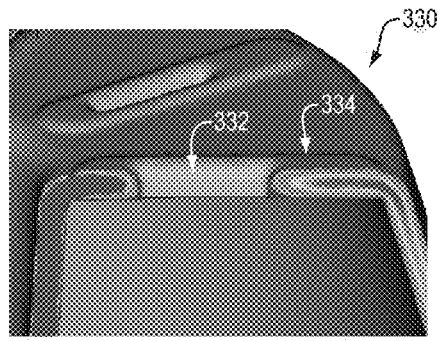
FIG. 23 is a perspective cross-sectional view of a simulation of flow velocities along a first flow path in a flow cavity having a nominal thickness of 0.4 mm and an increase in thickness of 0.13 mm in the enhanced velocity region, where the enhanced velocity region extends a distance of about 2.2 mm downstream of the aperture-forming region, in accordance with some embodiments.
Figure 24:
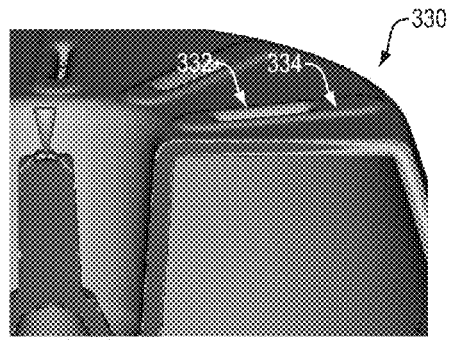
FIG. 24 is a perspective cross-sectional view of a simulation of flow velocities along a second flow path in the flow cavity of FIG. 23, in accordance with some embodiments.
Figure 25:
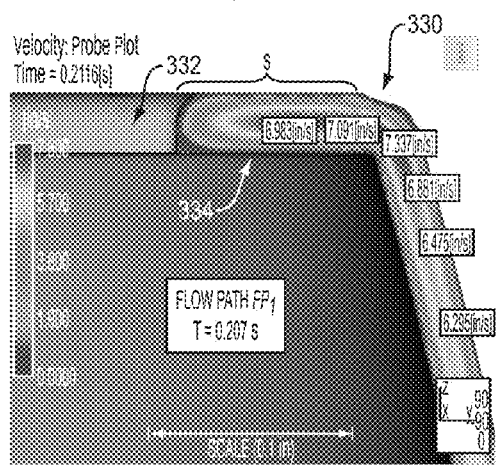
FIG. 25 is a side cross-sectional view of simulated flow velocities along the first flow path at 0.207 s after initiation of injection, in accordance with some embodiments.

FIGS. 23 through 28 depict cross-sectional views of simulated fluid flow within a mold cavity 330 at different times during the injection molding process for a cavity having adequate enhanced velocity regions 334 proximal to aperture-forming regions 332. FIG. 23 depicts a perspective cross-sectional view through an aperture-forming region 332 of the mold cavity 330 corresponding to a first flow path $FP_1$ downstream of an aperture-forming region 332. FIG. 24 depicts a perspective cross-sectional view corresponding to a second flow path $FP_2$ that is between two aperture-forming regions 332. FIG. 25 depicts a side cross-sectional view through the aperture-forming region 332 and the enhanced velocity region 334. The cavity 330 has a thickness of 0.4 mm away from the enhanced velocity region and an increase in thickness of 0.133 mm in the enhanced velocity region 334, which extends a distance S (e.g., about 2.2 mm) downstream of the aperture-forming region 332. This embodiment produced a bridged gap having a bridge thickness of about 2 μm.

Figure 26:
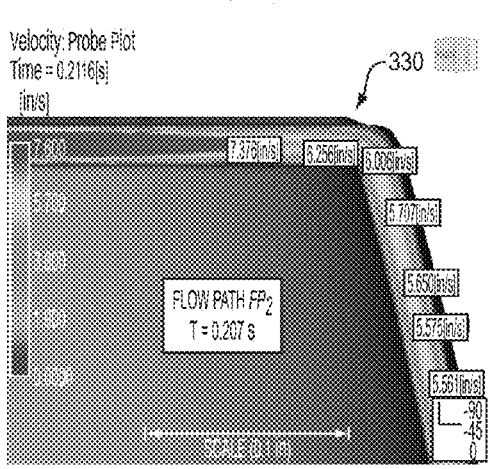
FIG. 26 is a side cross-sectional view of simulated flow velocities along the second flow path at 0.207 s after initiation of injection, in accordance with some embodiments.

As depicted in FIG. 25, at the junction of the base and sidewall of the cavity 330 along the first flow path $FP_1$ the flow velocity is about 7.34 in/s (about 186 mm/s) at T=0.207 s. For comparison, FIG. 26 depicts a 6.01 in/s (about 153 mm/s) flow velocity at the base-sidewall junction of the cavity along the second flow path $FP_2$ at the same time. The flow downstream of the aperture 332 along $FP_1$ is faster than the flow along $FP_2$ between the apertures 332. Thus, the enhanced velocity region more than compensates for the aperture-forming region's effect on the flow velocity downstream of the aperture-forming region.

Figure 27:
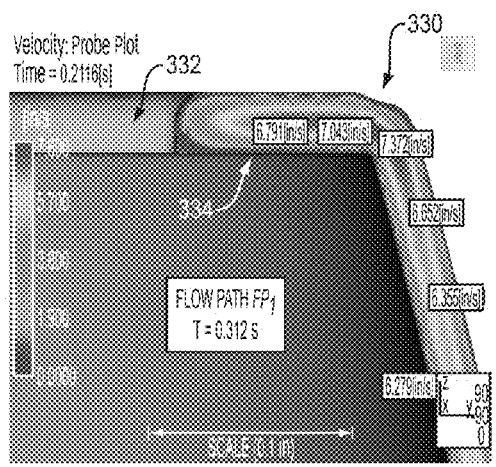
FIG. 27 is a side cross-sectional view of simulated flow velocities along the first flow path at 0.312 s after initiation of injection, in accordance with some embodiments.
Figure 28:
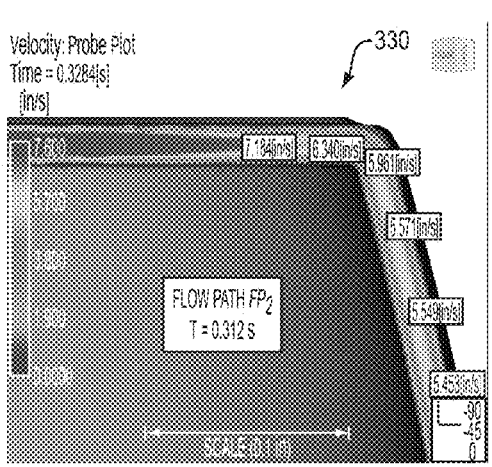
FIG. 28 is a side cross-sectional view of simulated flow velocities along the second flow path at 0.312 s after initiation of injection, in accordance with some embodiments.

FIGS. 27 and 28 depict flow velocities along $FP_1$ and along $FP_2$, respectively, at a later time T=0.312 s. Again, the flow velocity along $FP_1$ downstream of the aperture-forming region 332 is greater than the flow velocity for a corresponding position along $FP_2$ between, but away from the aperture forming features as depicted in FIG. 1 (e.g., 7.37 in/s or about 187 mm/s along $FP_1$ at the base-sidewall junction as compared to 5.96 in/s or about 153 mm/s along $FP_2$ at the base-sidewall junction). Because the flow velocity downstream of the aperture-forming regions 332 is at least as large as the flow velocity away from the aperture-forming regions, the leading edge of the first material flow and the leading edge of the second material flow will exhibit less large-scale distortion downstream of the apertures.

Figure 29:
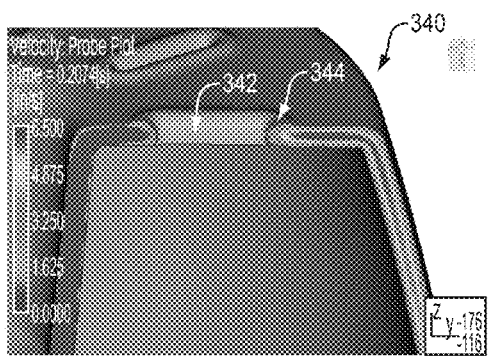
FIG. 29 is a perspective cross-sectional view of a simulation of flow velocities along a first flow path in a flow cavity having a nominal thickness of 0.4 mm and an increase in thickness of 0.075 mm in the enhanced velocity region, where the enhanced velocity region extends a distance of about 0.5 mm downstream of the aperture-forming region.
Figure 30:
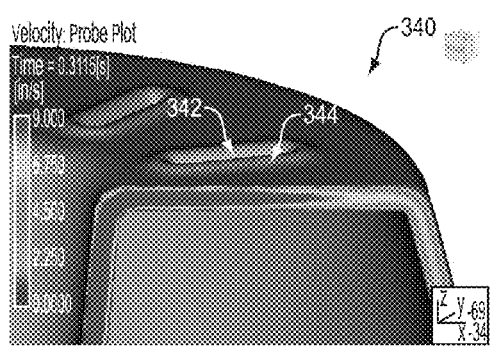
FIG. 30 is a perspective cross-sectional view of a simulation of flow velocities along a second flow path in the flow cavity of FIG. 29, in accordance with some embodiments.
Figure 31:
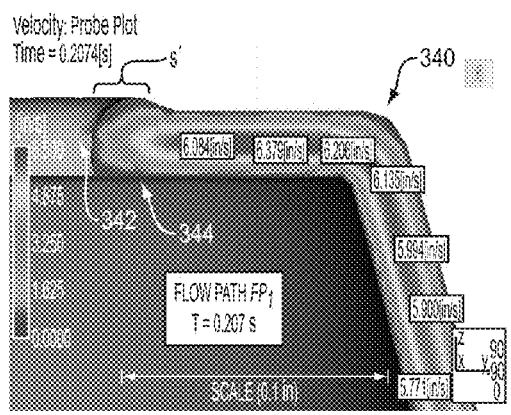
FIG. 31 is a side cross-sectional view of simulated flow velocities along the first flow path at 0.207 s after initiation of injection, in accordance with some embodiments.

FIGS. 29 through 34 depict cross-sectional views of fluid flow within a mold cavity at different times during the injection molding process for a cavity 340 with enhanced velocity regions 344 that do not fully compensate for the aperture-forming regions' effects on the flow velocity downstream of the aperture-forming regions 342. FIG. 29 depicts a perspective cross-sectional view through an aperture-forming region 342 of a mold cavity 340 corresponding to a first flow path $FP_1$ downstream of an aperture-forming region 342. FIG. 30 depicts a perspective cross-sectional view corresponding to a second flow path $FP_2$ that between, but away from the aperture-forming regions. FIG. 31 depicts a side cross-sectional view through the aperture-forming region 342 and the enhanced velocity region 344. The cavity 340 has a thickness of 0.4 mm away from the enhanced velocity region 344 and an increase in thickness of 0.075 mm in the enhanced velocity region 344. This is smaller than the 0.13 mm increase in thickness for the enhanced velocity region 334 for the cavity depicted in FIGS. 23-28. Further, the enhanced velocity region 344 extends downstream of the aperture-forming region 342 by a distance S' (e.g., about 0.5 mm), which is smaller than the distance S that the enhanced velocity region 334 extended downstream for the cavity depicted in FIGS. 23-28. The smaller increase in thickness for the enhanced velocity region and the shorter extent of the enhanced velocity region reduce the effectiveness of the enhanced velocity region in counteracting the aperture-forming region's drag on flow velocity for this cavity.

Figure 32:
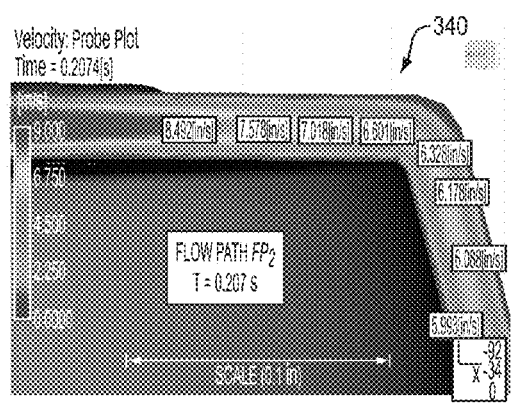
FIG. 32 is a side cross-sectional view of simulated flow velocities along the second flow path at 0.207 s after initiation of injection, in accordance with some embodiments.

As depicted in FIG. 31, at the base-sidewall junction of the cavity 340 along the first flow path $FP_1$ the flow velocity is about 6.14 in/s (about 156 mm/s) at T=0.207 s. For comparison, FIG. 32 depicts a 6.33 in/s (about 161 mm/s) flow velocity at the base-sidewall junction of the cavity 340 along the second flow path $FP_2$ at the same time. The flow downstream of the aperture-forming region 342 along $FP_1$ is slower than the flow along $FP_2$ at a corresponding location (e.g., about 0.19 in/s or 5 mm/s slower at the base-sidewall junction). Thus, the enhanced velocity region 344 does not fully compensate for the aperture-forming region's effect on the flow velocity downstream of the aperture-forming region 342.

Figure 33:
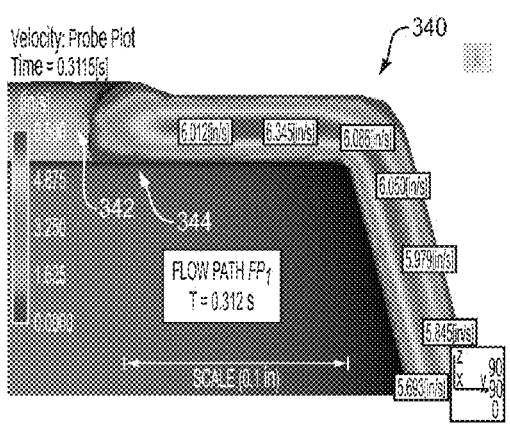
FIG. 33 is a side cross-sectional view of simulated flow velocities along the first flow path at 0.312 s after initiation of injection, in accordance with some embodiments.
Figure 34:
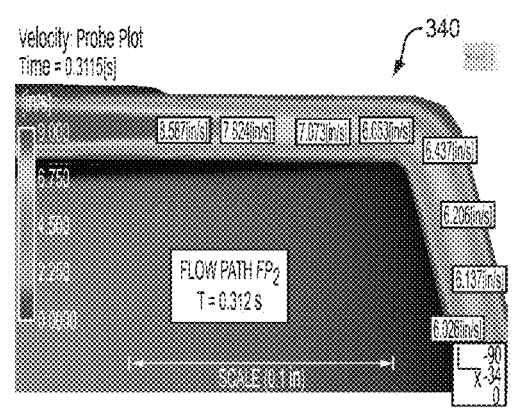
FIG. 34 is a side cross-sectional view of simulated flow velocities along the second flow path at 0.312 s after initiation of injection, in accordance with some embodiments.

As time progresses, the fluid velocity downstream of the aperture-forming region along $FP_1$ lags further behind the fluid velocity at a corresponding point along $FP_2$. FIGS. 33 and 34 depict flow velocities along $FP_1$ and along $FP_2$, respectively, at a later time T=0.3412 s. Again, the flow velocity along $FP_1$ downstream of the aperture-forming region is slower than the flow velocity for a corresponding position along $FP_2$, (e.g., about 6.07 in/s or 154 mm/s for $FP_1$ and about 6.44 in/s or 164 mm/s for $FP_2$ at the base-sidewall junction). Thus, at the later time the flow velocity downstream of the aperture-forming region lags further behind the flow velocity at a corresponding location on a flow path away from an aperture. This reduction in flow velocity causes distortion of the leading edges of the flow downstream of the aperture, but the distortion is smaller than the distortion that would have occurred if there were no enhanced velocity regions. Thus, the downstream gap in the interior layer for the resulting article is larger for this cavity than for the cavity of FIGS. 23-28, but is smaller than the downstream gap created in an article from a cavity having a similar aperture-forming region, but no enhanced velocity region.

Figure 35:
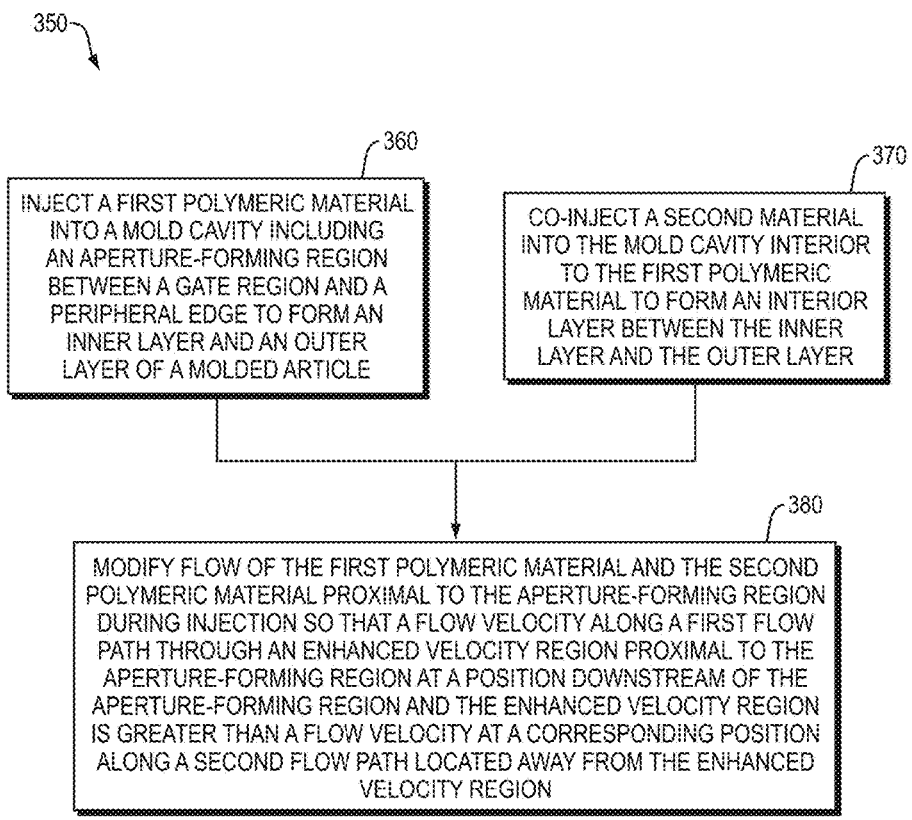
FIG. 35 is a flow diagram schematically depicting a method of co-injection molding a multi-layer article having a molded aperture between a gate region and a peripheral edge region of the article, in accordance with some embodiments.

The flow chart in FIG. 35 schematically depicts a method 350 of co-injection molding a multi-layer article having a molded aperture formed between a gate region and an edge region of the article. For illustrative purposes, the method is described with reference to exemplary system 10; however, in other embodiments, the method may be implemented using other suitable systems. In step 360, a first polymer material is injected into a mold cavity 24 to form a molded article including an inner layer of the first polymeric material and an outer layer of the first polymeric material. The mold cavity 24 includes an aperture-forming region 25 configured to form an aperture between a gate region and a peripheral edge of the resulting molded article. In step 370, a second polymeric material is co-injected into the mold cavity 24 interior to the first polymeric material to form an interior layer of the second material between the inner layer and the outer layer of the first material with the aperture extending through the interior layer. In step 380, during injection, the flow of the first polymeric material and the second polymeric material is modified in an enhanced velocity region proximal to the aperture-forming region so that a flow velocity along a first flow path passing proximal to an aperture-forming region at a position downstream of the aperture-forming region is equal to or greater than a flow velocity at a corresponding position along a second flow path located away from the aperture forming region and the enhanced velocity region (e.g., see discussion of FIGS. 23-28 above).

In some embodiments the flow of the first polymeric material and the second polymeric material proximal to the aperture-forming region of the mold cavity is modified such that the interior layer extends over at least 95% of a perimeter of a cross-section of the resulting article downstream of the aperture. In some embodiments, the flow of the first polymeric material and the second polymeric material proximal to the aperture-forming region of the mold cavity is modified such that the interior layer extends over at least 98% of a cross-sectional perimeter of the article downstream of the aperture. In some embodiments, the flow of the first polymeric material and the second polymeric material proximal to the aperture-forming region of the mold cavity is modified such that the interior layer extends over at least 99% of a cross-sectional perimeter of the article downstream of the aperture. In other embodiments, the downstream gap may be bridged, In some embodiments the flow of the first polymeric material and the second polymeric material proximal to the aperture-forming region of the mold cavity is modified by a region of increased cavity thickness proximal to the aperture-forming region of the mold cavity.

Figure 36:
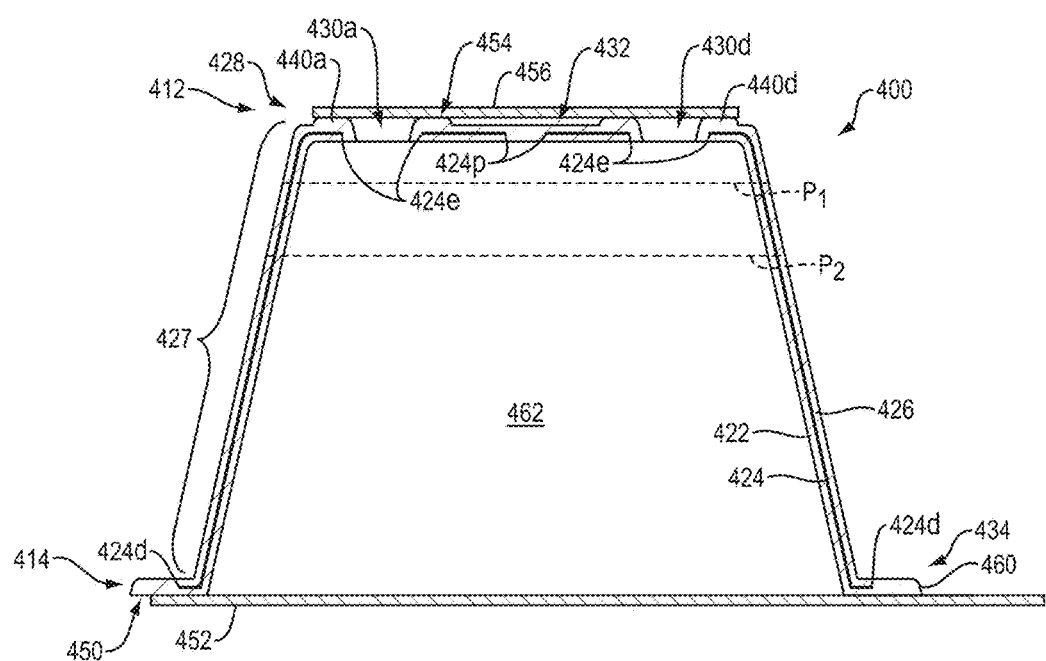
FIG. 36 schematically depicts a side cross-sectional view of a multilayer co-injection molded article having molded apertures between a gate region and a peripheral edge region and seals forming a container, in accordance with some embodiments.

FIG. 36 depicts a resulting multilayer co-injection molded plastic article 400, in accordance with some embodiments. Plastic article 400 includes an inner layer 422 and an outer layer 426 of the first material, which together generally conform to the desired end shape of the final article, accounting for manufacturing requirements (e.g., thermal expansion/contraction) as is known. In some embodiments, the inner layer 422 and the outer layer 426 may be referred to as the skin of the article. The second polymeric material forms interior layer 424, which may be referred to as a "core layer," disposed between inner layer 422 and outer layer 426. Interior layer 424 may be a barrier layer, a gas scavenging layer, and/or a desiccant layer. For example, a gas barrier material of interior layer 424 may be EVOH or other suitable materials, which are known or may become known, that sufficiently prevent gases, for example, oxygen, from permeating through the article, i.e., from the outside to the inside and vice versa. Though PET, PP, and EVOH are commonly used materials, it should be understood what other suitable materials may be used, and that the various embodiments are suitable for use with other polymeric materials.

Article 400 includes a gate region 432, a peripheral edge 434, and molded apertures 440a, 440d extending through the inner layer 422, the outer layer 426, and the interior layer and 424 and disposed between the gate region 432 and the peripheral edge 434. The article 400 may include an increased thickness region 440a, 440d, proximal to each molded aperture 430a, 430b. In some embodiments, the interior layer 424 extends over at least 95% of a perimeter (e.g., $P_1$, $P_2$) of the article downstream of the molded aperture(s). In some embodiments, the interior layer 424 extends over at least 98% of a perimeter (e.g., $P_1$, $P_2$) of the article downstream of the molded aperture(s). In some embodiments, the interior layer 424 extends over at least 99% of a perimeter (e.g. $P_1$, $P_2$) of the article downstream of the molded apertures(s).

A first end portion 412 of the article includes the gate region 432 and a second end portion 414 of the article includes the peripheral edge 434. In some embodiments, the first end portion 412 may include a first sealing surface 454. As depicted, a first seal 456 may be applied to the first sealing surface 454 to seal the first end portion 412 of the article. The second end portion 414 may include a second sealing surface 450 (e.g. on a flange 460). As depicted, a second seal 452 may be applied to the second sealing surface 450 to seal the second end portion 414 of the article. In different embodiments, various types of sealing surfaces may be employed (e.g. surfaces configured for heat-sealing and crimping, threaded surfaces, etc.). In different embodiments, the second end portion of the article may have a structure other than a flange (e.g., an open end tube to be welded closed such as a toothpaste tube). Various methods may be used for sealing the sealing surface 135 (e.g., heat-sealing, crimping, threading, and other known methods).

The amount that the interior layer extends through the article varies for different embodiments. In some embodiments the interior layer may not extend throughout the article. For example, in article 400 of FIG. 36, interior layer 424 extends from a sidewall portion 427 to a base portion 428 and terminates at 424p before gate region 1432. Interior layer 424 also extends from sidewall portion 427 to flange 460 and terminates at 424d without extending to an edge of flange 460. In some embodiments, an interior layer may extend through the base portion and into the gate region (e.g., see FIG. 1) or may terminate in the sidewall portion.

Throughout the figures, all thicknesses are exaggerated for illustrative purposes. Further, relative thicknesses are not representative.

In some embodiments, a resulting plastic article may be configured for use as a container (e.g., for containing food, beverages, pharmaceutical, nutraceuticals and/or other gas-sensitive products). For example, in FIG. 36, first seal 456, second seal 452, and sidewall portion 460, enclose a sealed container volume 462 for storing a product.

Substantially all of the unsealed surface area of the article exposed to the product may include an interior layer. As used herein, the term "substantially" or "substantially fully" means 95%-100% coverage of the interior layer across the entire surface area of the article exposed to the container volume for storing product. As depicted in FIG. 36, interior layer 424 need not extend to gate region 432 or to an edge of flange 460 because those portions of the article 400 are covered by the first seal 456 and the second seal 452 respectively.

Figure 37:
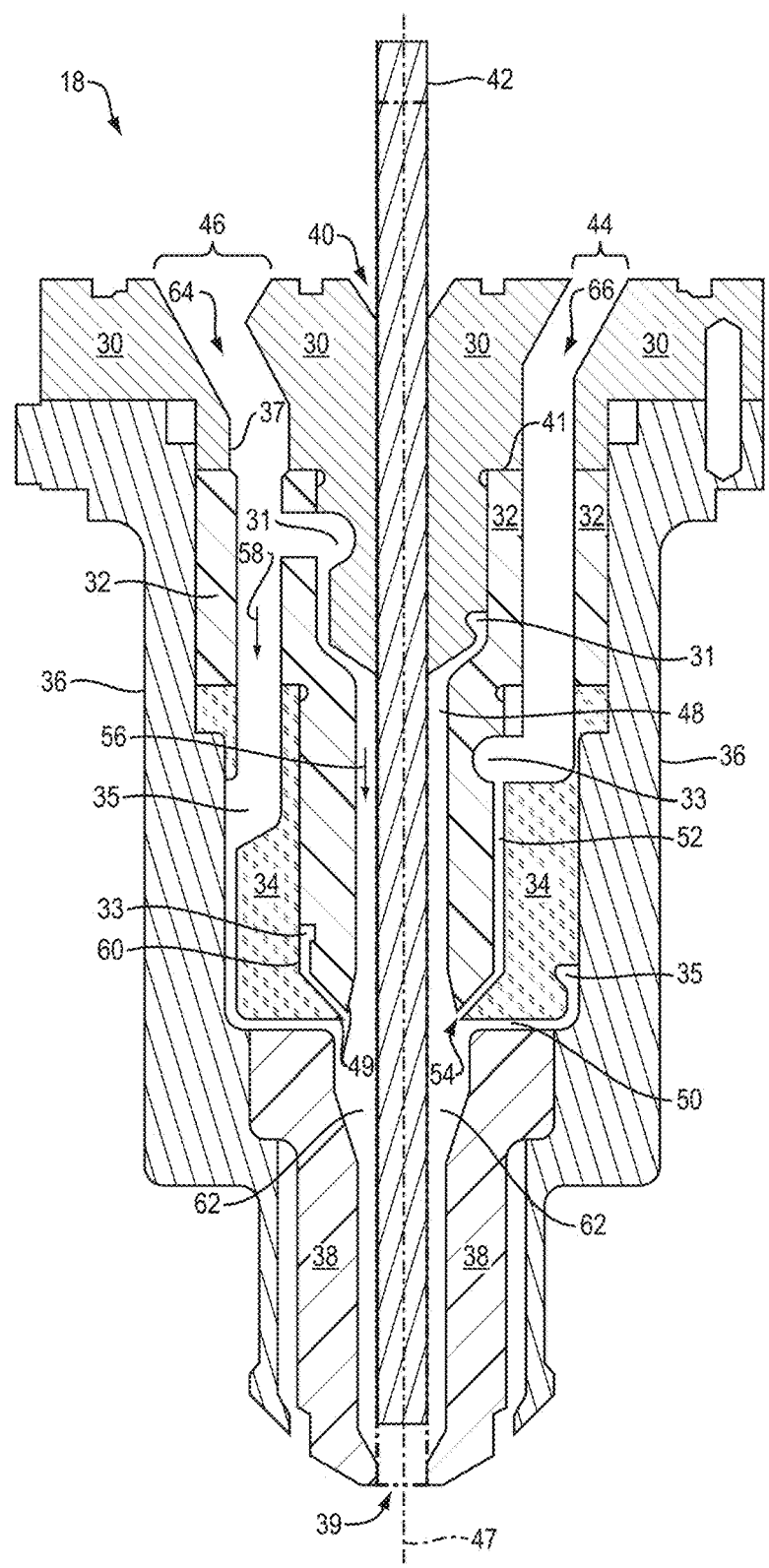
FIG. 37 schematically depicts an exemplary nozzle assembly suitable for practicing embodiments taught herein.

FIG. 37 depicts an exemplary nozzle assembly suitable for practicing embodiments taught herein. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 10, for forming a plastic object having two or more layers.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis of the nozzle assembly 18. Through bore 40 has an inner wall diameter that varies along a central longitudinal axis of the nozzle assembly 18. Valve pin 42 is movable in an axial direction along the central longitudinal axis of nozzle assembly 18 to assist in controlling the flow of the first polymeric material 64 and second polymeric material 66 through nozzle assembly 18 and into mold 24.

Middle combining means 32 cooperatively engages with the inner combining means 30 to form a portion of the plurality of annular flow channels in nozzle assembly 18. Middle combining means 32 receives from channel 37 the first polymeric material 64 and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. Annular fluid flow passage 48 channels an annular flow stream of the inner material stream 56 into stream combination area 54 through an orifice.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through another orifice.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through an orifice. The first polymeric material 64 fed into the stream combination area 54 through the orifice forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio as discussed above. In this manner, the valve pin 42 may remain in a fixed position and does not need to be moved to control or form a particular volumetric flow ratio. In other words, the nozzle assembly 18 has a channel configuration and structure to output a desired or selected volumetric flow ratio without the need of an associated controller or microprocessor. In some exemplary embodiments, the valve pin 42 may be controlled by a controller or microprocessor to control the volumetric flow ratio.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D. With the valve pin 42 in a withdrawn position as depicted, a flow path is established between the output portion and the gate of the mold cavity. Having the valve pin 42 in an advanced position as depicted by dotted lines 42, the flow path from the output portion to the gate of the mold cavity is blocked.

The annular output stream 49 formed by the stream combination area 54 has an outer annular skin layer and an inner annular skin layer formed of the first polymeric material 64, and an interior or core annular layer formed of the second polymeric material 66. The inner and outer skin layers of the first polymeric material 64 may each have a substantially like cross sectional area as the materials flow through the fluid flow passage 62 to the output portion 39. Typical ratios of inner to outer volumetric flow rate are between 80:20 and 20:80. The exact ratio is chosen to locate the interior layer at the desire position within the wall of the molded article. The inner and outer skin layers of the first polymeric material 64 encapsulate the interior layer of the second polymeric material 66, which forms a core portion of a resulting plastic object. Upon injection from the nozzle assembly 18, the combined polymeric stream 49, includes an interior stream that flows along concentric or annular streamlines between the inner and outer polymeric streams.

Figure 38:
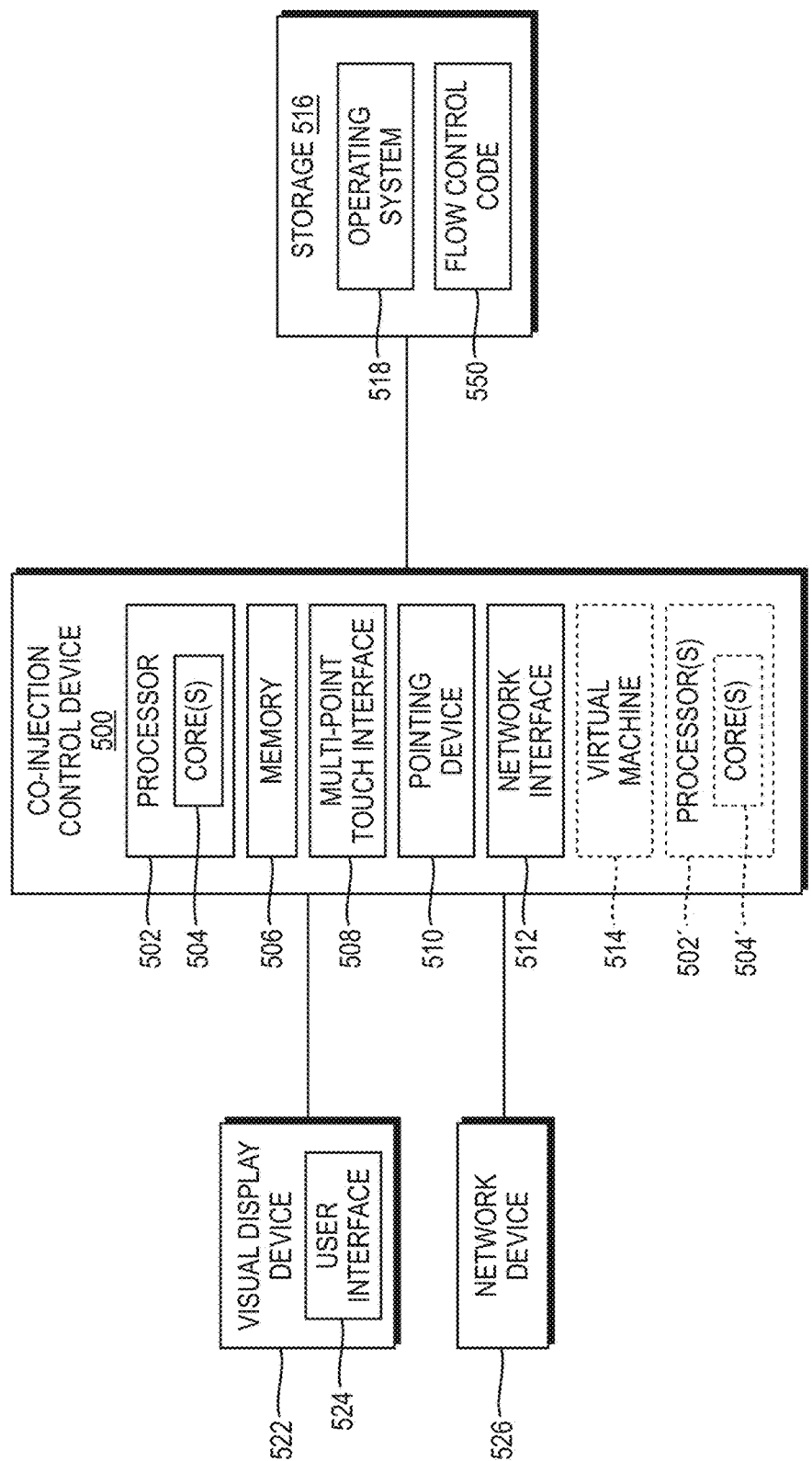
FIG. 38 schematically depicts an exemplary computing environment suitable for practicing exemplary embodiments taught herein.

FIG. 38 depicts an exemplary computing environment suitable for practicing exemplary embodiments taught herein. The environment may include a co-injection control device 500 coupled, wired, wirelessly or a hybrid of wired and wirelessly, to co-injection system 10. The co-injection control device 500 is programmable to implement executable Flow Control Code 550 for forming a barrier layer and/or scavenger layer. Co-injection control device 500 includes one or more computer-readable media for storing one or more computer-executable instructions or software for implementing exemplary embodiments. The computer-readable media may include, but are not limited to, one or more types of hardware memory, non-transitory tangible media, etc. For example, memory 506 included in the co-injection control device 500 may store computer-executable instructions or software, e.g., instructions for implementing and processing every module of the executable Flow Control Code 550. Co-injection control device 500 also includes processor 502 and, one or more processor(s) 502' for executing software stored in the memory 506, and other programs for controlling system hardware. Processor 502 and processor(s) 502' each can be a single core processor or multiple core (504 and 504') processor.

Virtualization may be employed in co-injection control device 500 so that infrastructure and resources in the computing device can be shared dynamically. Virtualized processors may also be used with the executable Flow Control Code 550 and other software in storage 516. A virtual machine 514 may be provided to handle a process running on multiple processors so that the process appears to be using only one computing resource rather than multiple. Multiple virtual machines can also be used with one processor.

Memory 506 may include a computer system memory or random access memory, such as DRAM, SRAM, EDO RAM, etc. Memory 506 may include other types of memory as well, or combinations thereof.

A user may interact with co-injection control device 500 through a visual display device 522, such as a computer monitor, which may display the user interfaces 524 or any other interface. The visual display device 522 may also display other aspects or elements of exemplary embodiments, e.g., materials databases, production information, etc. Co-injection control device 500 may include other I/O devices such a keyboard or a multi-point touch interface 508 and a pointing device 510, for example a mouse, for receiving input from a user. The keyboard 508 and the pointing device 510 may be connected to the visual display device 522. Co-injection control device 500 may include other suitable conventional I/O peripherals. Co-injection control device 500 may further include a storage device 516, such as a hard-drive, CD-ROM, or other non-transitory computer readable media, for storing an operating system 518 and other related software, and for storing executable Flow Control Code 550.

Co-injection control device 500 may include a network interface 512 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing authorization computing device 500 to any type of network capable of communication and performing the operations described herein. Moreover, co-injection control device 500 may be any computer system such as a workstation, desktop computer, server, laptop, handheld computer or other form of computing or telecommunications device that is capable of communication and that has sufficient processor power and memory capacity to perform the operations described herein.

Co-injection control device 500 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Flow Control Code 550 includes executable code executable by the processor 502 to control the co-injection system 10 to control a position of the valve pin 42 for controlling flow of the co-polymer stream into the mold cavity and forming an aperture in a gate region of a resulting multilayer plastic article. The executable code executable by the processor 502 may also control a temperature of at least portions of the gate pin 42, and control a temperature of at least portions of the mold 24. The executable code may be executable by the processor 502 to selectively control a volumetric flow volume of the inner and outer polymeric streams, control a position of the interior core material stream relative to a velocity flow front of the combined polymeric stream, and control extrusion start time of the interior core stream relative to the extrusion start time of the inner and outer polymeric streams. Co-injection systems taught herein facilitate the co-injection molding of container such as food or beverage containers.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

What is claimed is:

1. A co-injection molded multilayer article, the article comprising:
    an inner layer comprising a first polymeric material;
    an outer layer comprising the first polymeric material;
    an interior barrier layer or scavenger layer comprising a second polymeric material, the interior barrier layer or scavenger layer disposed between the inner layer and the outer layer; and
    a molded aperture disposed between a gate region of the article and a peripheral edge region of the article, the molded aperture extending through the inner layer, the outer layer, and the interior layer, wherein the interior layer extends over a perimeter of a cross-section of the article downstream of the molded aperture, wherein the interior layer is surrounded by the inner layer and the outer layer at an edge of the molded aperture, and wherein the article has an increased thickness region proximal to the molded aperture.

2. The article of claim 1, wherein the interior barrier layer or scavenger layer extends over at least 95% of the perimeter of the cross-section of the article downstream of the aperture.

3. The article of claim 1, wherein the interior barrier layer or scavenger layer extends over at least 98% of the perimeter of the cross-section of the article downstream of the aperture.

4. The article of claim 1, wherein the interior barrier layer or scavenger layer extends over at least 99% of the perimeter of the cross-section of the article downstream of the aperture.

5. The article of claim 1, wherein the article has a sealable portion and wherein the interior layer terminates proximate to the sealable portion.

6. The article of claim 1, wherein the article has a first sealing surface and a second sealing surface, and wherein the interior layer covers at least 95% of a surface area of the article between the first sealing surface and the second sealing surface.

7. The article of claim 6, wherein the interior barrier layer or scavenger layer covers at least 99% of the surface area of the article between the first sealing surface and the second sealing surface.

8. The article of claim 1, wherein the first polymeric material is selected from the group consisting of: polyethylene terephthalate (PET), ethylene vinyl alcohol (EVOH), MXD6 nylon, polypropylene (PP), and polycarbonates (PC).

9. The article of claim 1, wherein the inner layer and the outer layer consist of the same polymeric material.

10. The article of claim 9, wherein the polymeric material is selected from the group consisting of: polyethylene terephthalate (PET), ethylene vinyl alcohol (EVOH), MXD6 nylon, polypropylene (PP), and polycarbonates (PC).

* * * * *